US012737943B2

(12) United States Patent
Tani et al.

(10) Patent No.: US 12,737,943 B2
(45) Date of Patent: Sep. 15, 2026

(54) EXPERIMENT SUPPORT APPARATUS, EXPERIMENT SUPPORT SYSTEM, EXPERIMENT SUPPORT METHOD, AND COMPUTER-READABLE MEDIUM

(71) Applicant: Evident Corporation, Tatsuno-machi (JP)

(72) Inventors: Yosuke Tani, Tokyo (JP); Hirofumi Hori, Tokyo (JP); Takahiro Furukawa, Tokyo (JP); Tsukasa Nittono, Tokyo (JP); Takayuki Komiya, Tokyo (JP)

(73) Assignee: Evident Corporation, Kamiina-Gun (JP)

( * ) Notice: Subject to any disclaimer, the term of this patent is extended or adjusted under 35 U.S.C. 154(b) by 0 days.

(21) Appl. No.: 18/539,287

(22) Filed: Dec. 14, 2023

(65) Prior Publication Data

US 2024/0111945 A1 Apr. 4, 2024

Related U.S. Application Data

(63) Continuation of application No. 17/493,763, filed on Oct. 4, 2021, now abandoned.

(30) Foreign Application Priority Data

Oct. 6, 2020 (JP) ................................ 2020-169376

(51) Int. Cl.
*G06F 40/177* (2020.01)
*G06F 40/106* (2020.01)
(Continued)

(52) U.S. Cl.
CPC .......... *G06F 40/177* (2020.01); *G06F 40/106* (2020.01); *G06F 40/171* (2020.01); *G06T 7/0004* (2013.01); *G06T 2207/10056* (2013.01)

(58) Field of Classification Search
CPC .... G06F 40/171; G06F 40/177; G06F 40/106; G06T 7/0004; G06T 11/60; G06T 2200/24; G06T 2207/10056
See application file for complete search history.

(56) References Cited

U.S. PATENT DOCUMENTS 9,459,776 B1 * 10/2016 Miller .................... G06Q 10/10
10,746,151 B2 * 8/2020 Chen .................... H02J 7/1446
(Continued)

FOREIGN PATENT DOCUMENTS

JP 2009180576 A 8/2009
JP 2016011853 A 1/2016
(Continued)

OTHER PUBLICATIONS

Katane et al., "Spin-polarization scanning electron microscope for performing distortion measurement of magnetic case, provides secondary electron spine-polarization-degree that determines width of area change locally and that evaluates distortion in sample", published on Oct. 3, 2019, p. 4 (Year: 2019).*
(Continued)

*Primary Examiner* — Chau T Nguyen
(74) *Attorney, Agent, or Firm* — Holtz, Holtz & Volek PC

(57) ABSTRACT

An experiment support apparatus includes: one or more non-transitory computer-readable media that include an instruction; and one or more processors that execute the instruction. The instruction is configured to cause the one or more processors to execute an operation, the operation includes: causing a display device to display a condition table TB that indicates an experiment condition for measurement, in response to an input of the experiment condition; and causing the display device to display at least one of a measurement result based on measurement data, or an analysis result of the measurement data, in a cell of the condition table TB, in response to an input of the measure- (Continued)

ment data, the measurement data being obtained using a measurement apparatus under the experiment condition corresponding to the cell.

13 Claims, 28 Drawing Sheets

(51) Int. Cl.
*G06F 40/171* (2020.01)
*G06T 7/00* (2017.01)

(56) References Cited

U.S. PATENT DOCUMENTS

2004/0234964 A1 11/2004 Cole et al.
2005/0265895 A1 12/2005 Kopelman
2007/0038414 A1 2/2007 Rasmussen et al.
2009/0008542 A1 1/2009 Sumiyoshi
2012/0283959 A1* 11/2012 Ruzic .................... G16C 20/70 702/23
2013/0016355 A1* 1/2013 Landry ................ G01N 21/534 356/442
2013/0218845 A1 8/2013 Kleppner et al.
2014/0157878 A1 6/2014 Ohashi et al.
2018/0067048 A1 3/2018 Horigome et al.
2018/0255187 A1 9/2018 Ajioka
2018/0348180 A1 12/2018 Kitano
2019/0192062 A1 6/2019 Felsing et al.
2019/0240918 A1 8/2019 Meyer et al.
2020/0123377 A1 4/2020 Nakanishi et al.
2020/0239756 A1 7/2020 Nakamura et al.
2020/0371001 A1 11/2020 Lekivetz et al.
2020/0402762 A1* 12/2020 Kohashi ................ H01J 37/268

FOREIGN PATENT DOCUMENTS

WO WO2007102201 A1 9/2007
WO WO2013011818 A1 1/2013
WO WO2017002156 A1 1/2017

OTHER PUBLICATIONS

Japanese Office Action (and an English language translation thereof) dated Mar. 26, 2024, issued in counterpart Japanese Application No. 2020-169376.
Japanese Office Action (Final Rejection) (and an English language translation thereof) dated Aug. 27, 2024, issued in counterpart Japanese Application No. 2020-169376.

* cited by examiner

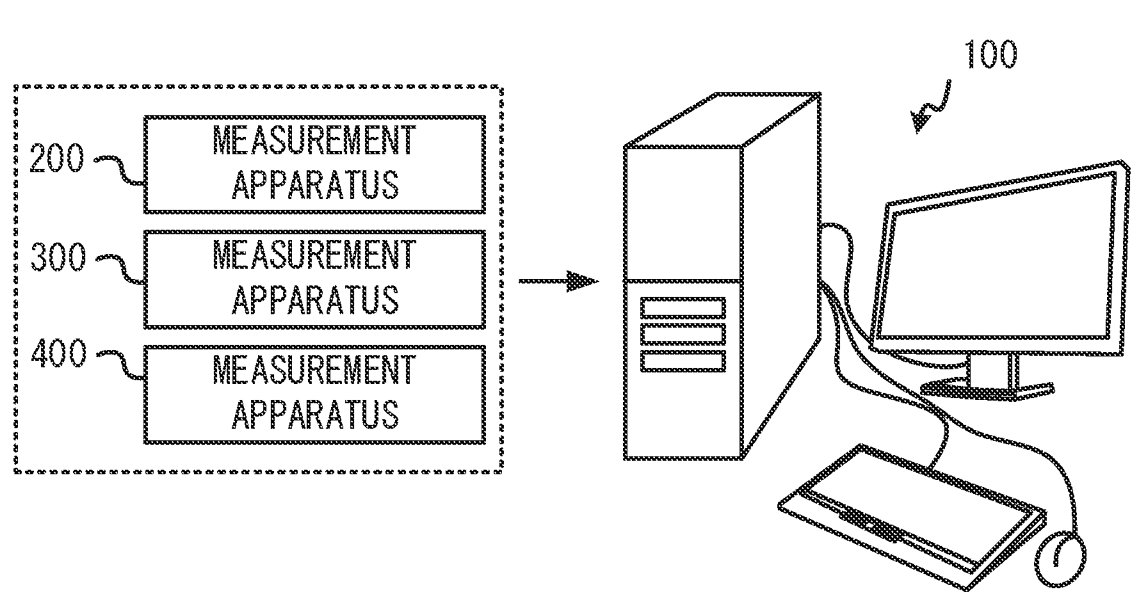
F I G. 1

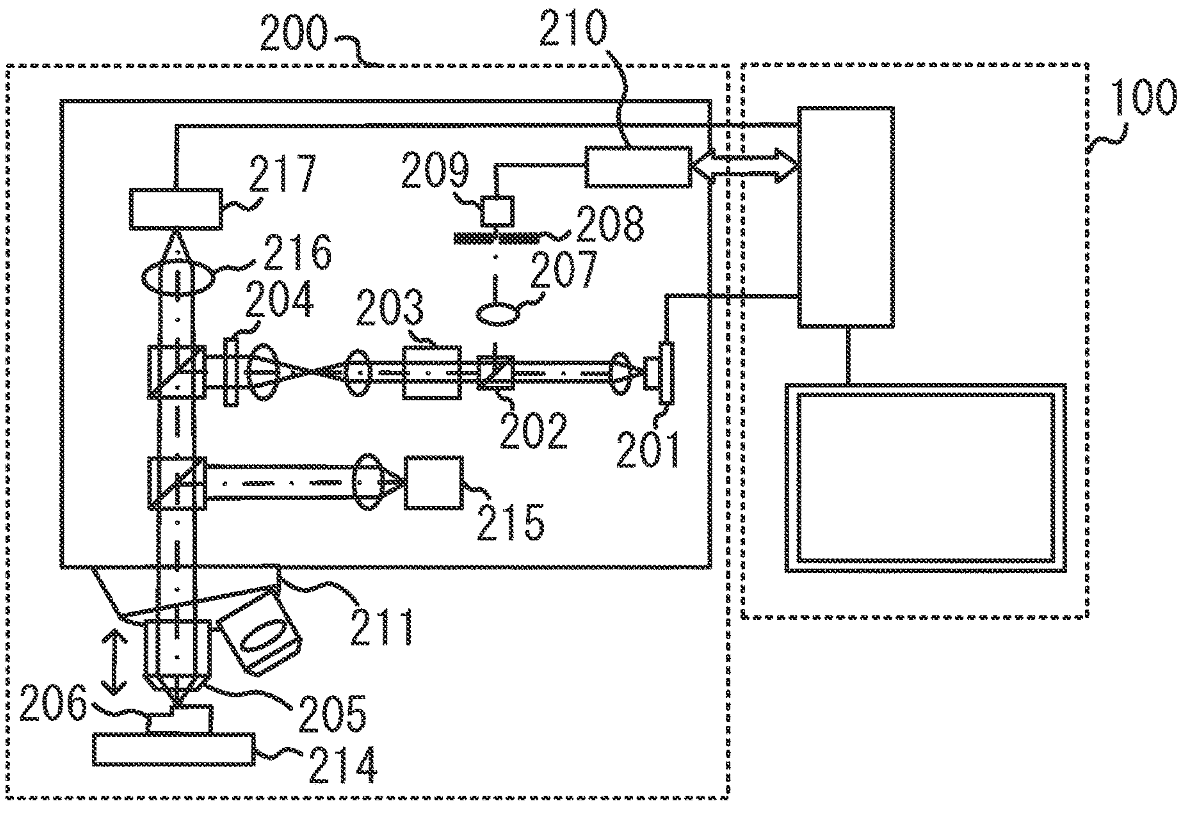
F I G. 2

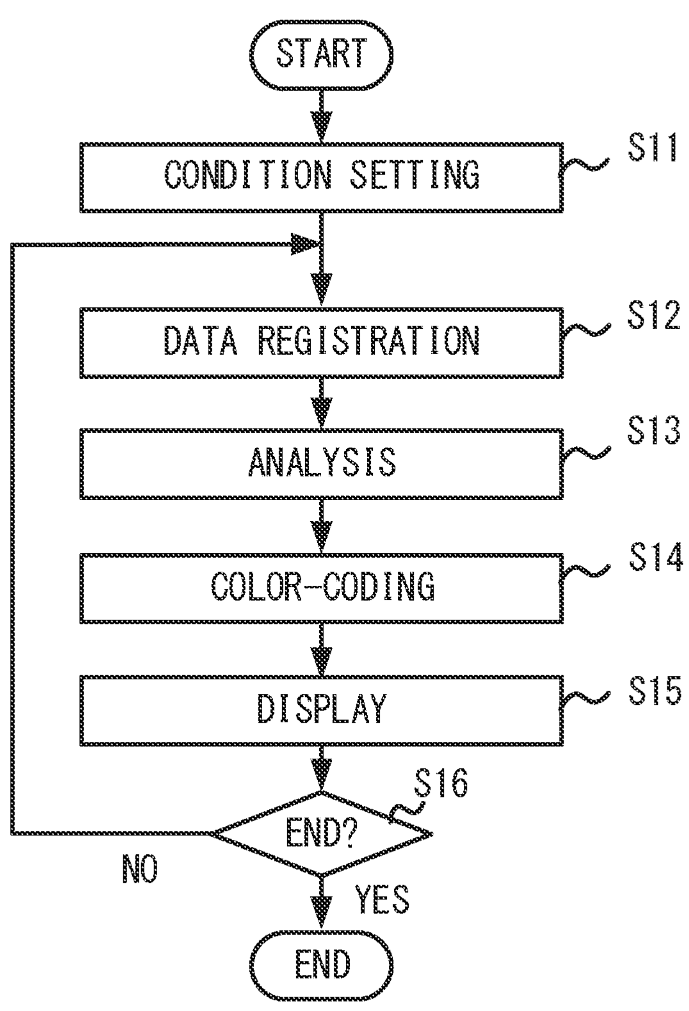
F I G. 5

CONDITION

CONDITION

TB

| | ⋯ | ⋯ | ⋯ | ⋯ | ⋯ | ⋯ | ⋯ |
|---|---|---|---|---|---|---|---|
| ⋯ | | | | | | | |
| ⋯ | | No Data | | No Data | | No Data | |
| ⋯ | | | | | No Data | | No Data |

FIG. 6

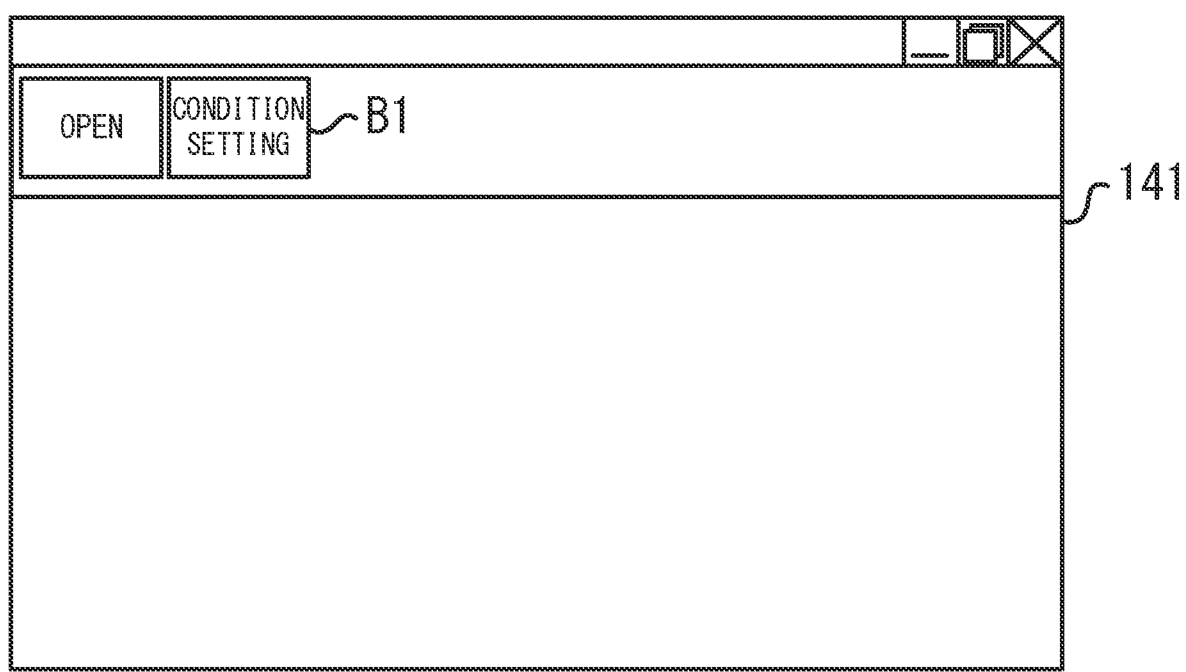
F I G. 7

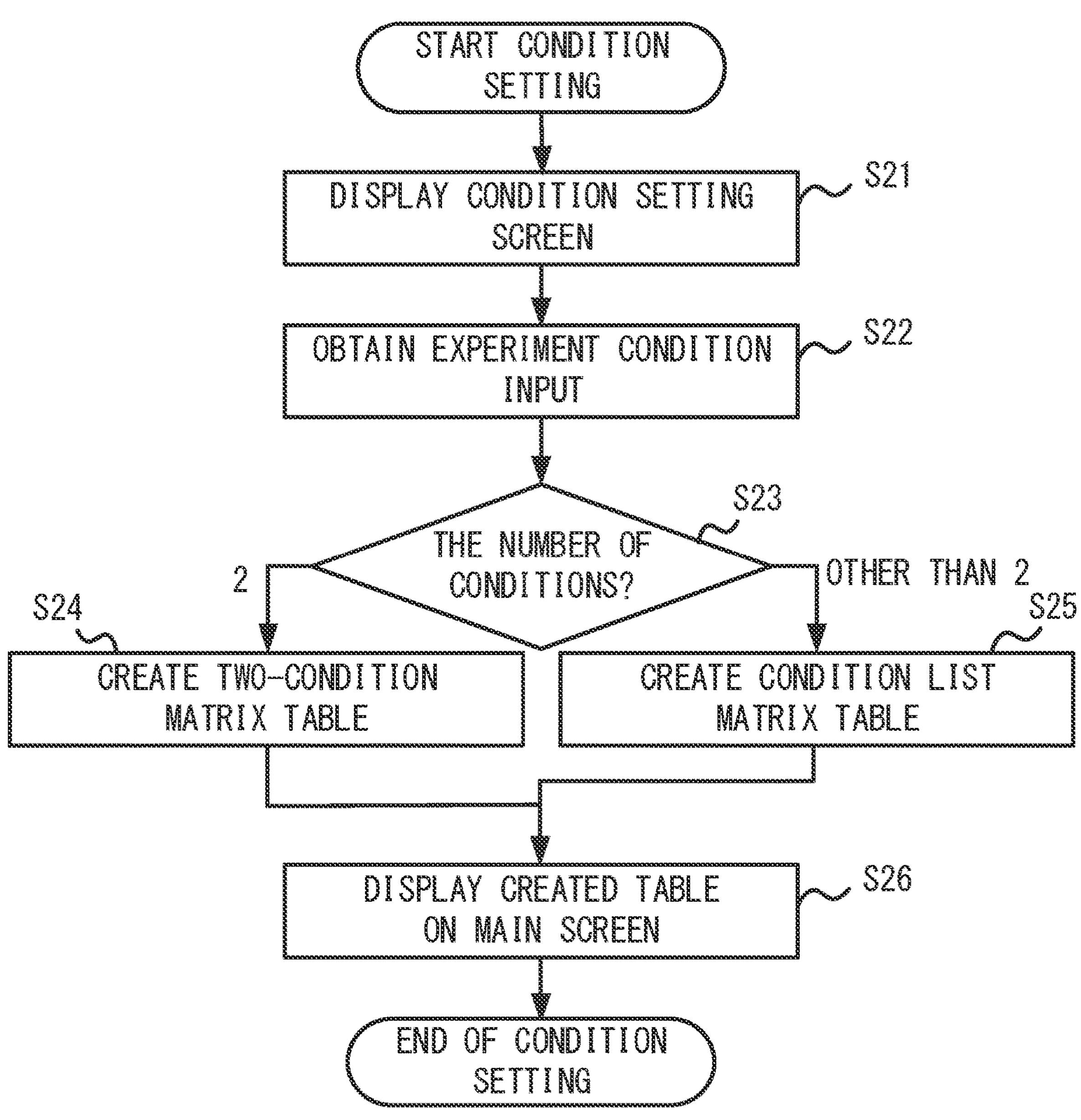
F I G. 8

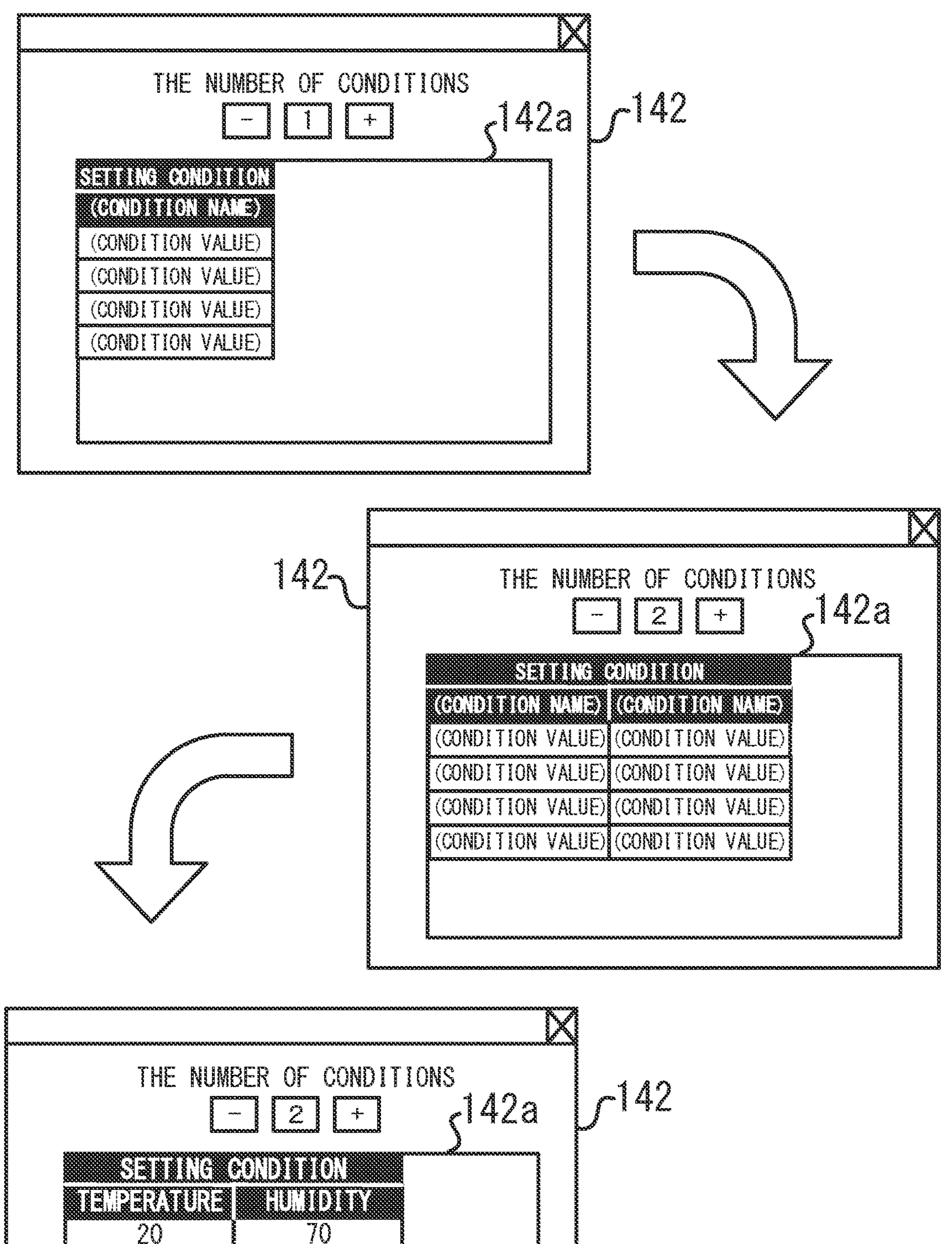
F I G. 9

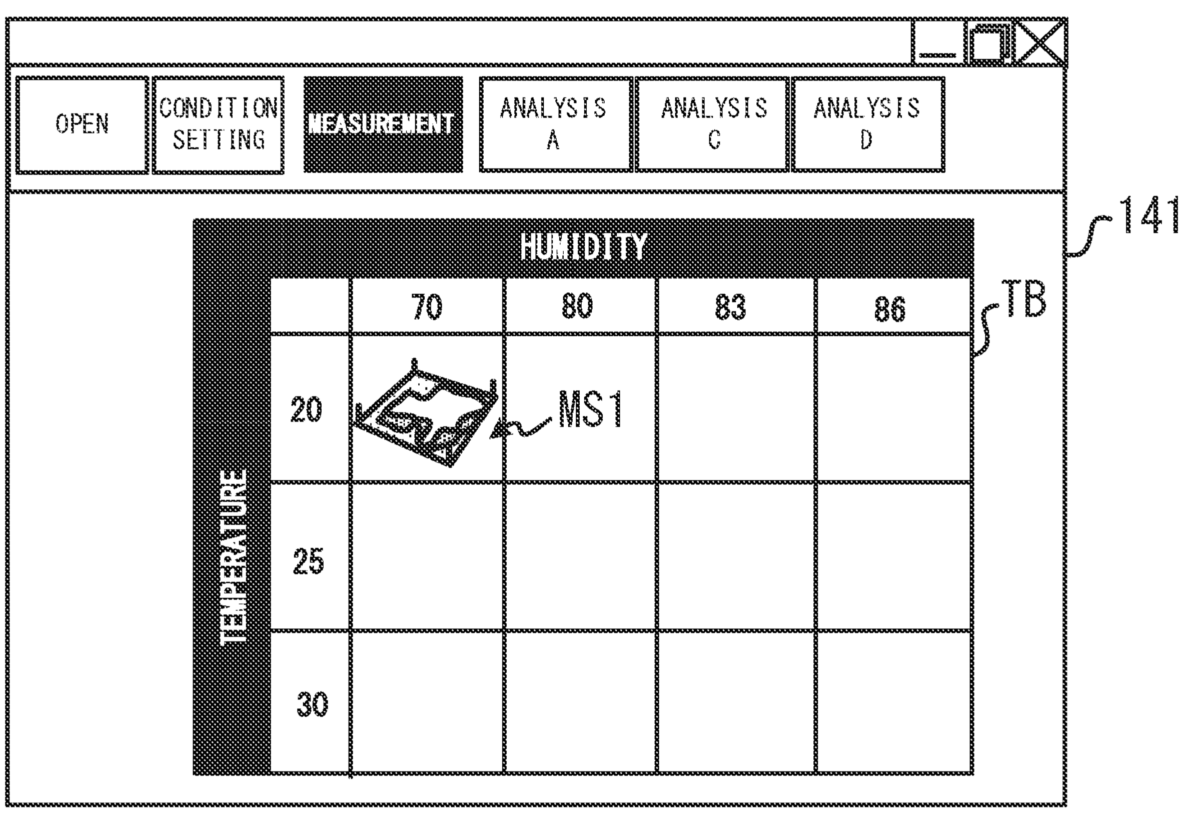
F I G. 19

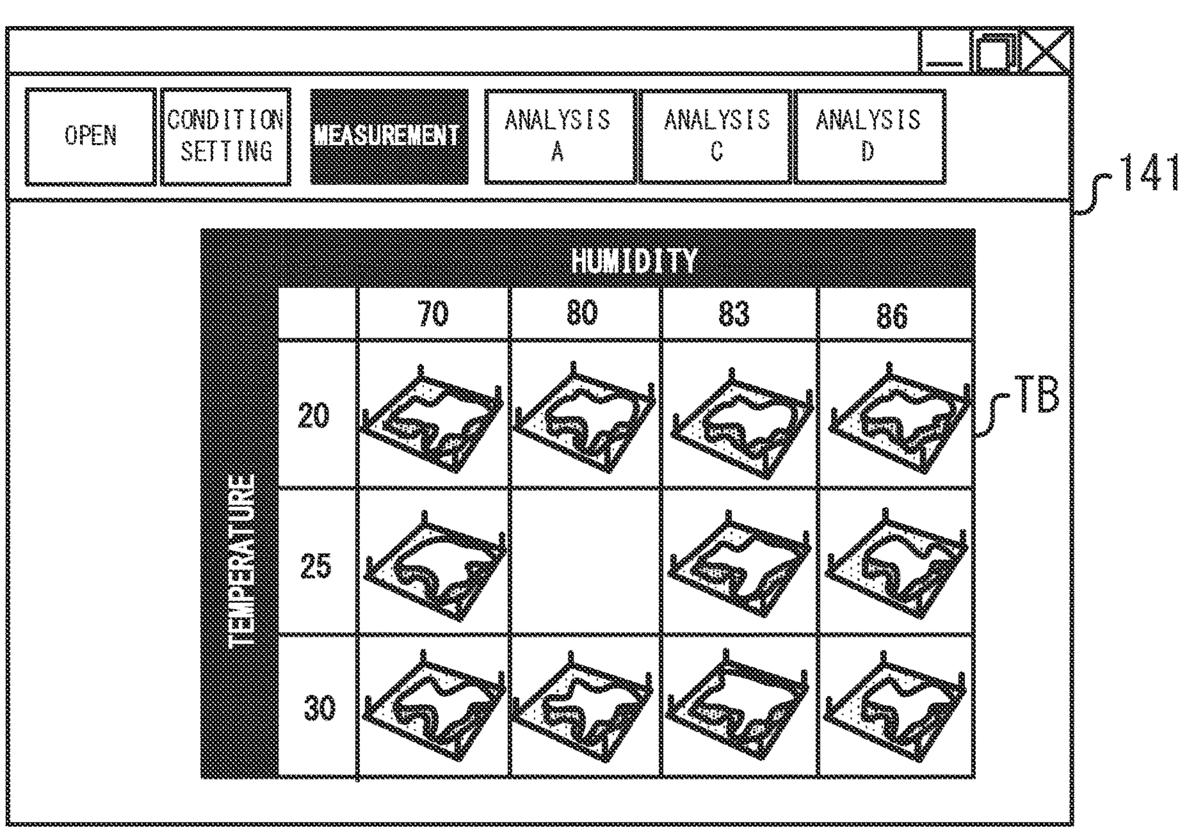
F I G. 2 1

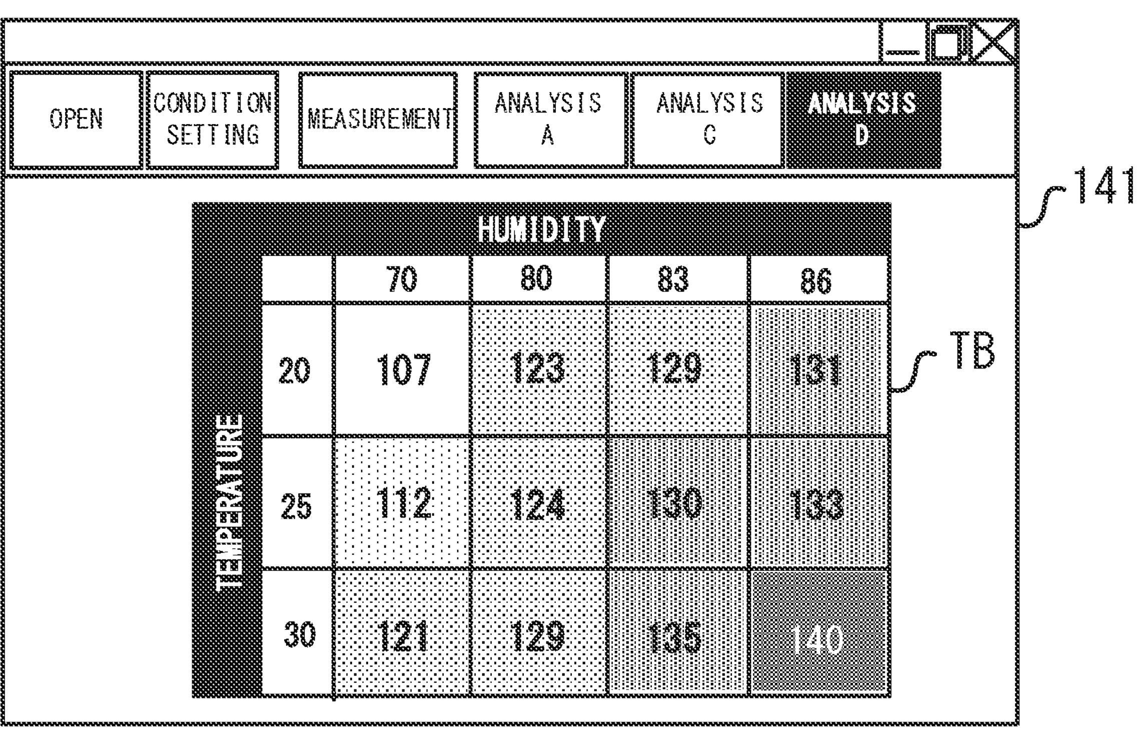
| | 70 | 80 | 83 | 86 |
|---|---|---|---|---|
| 20 | 107 | 123 | 129 | 131 |
| 25 | 112 | 124 | 130 | 133 |
| 30 | 121 | 129 | 135 | 140 |
F I G. 2 3

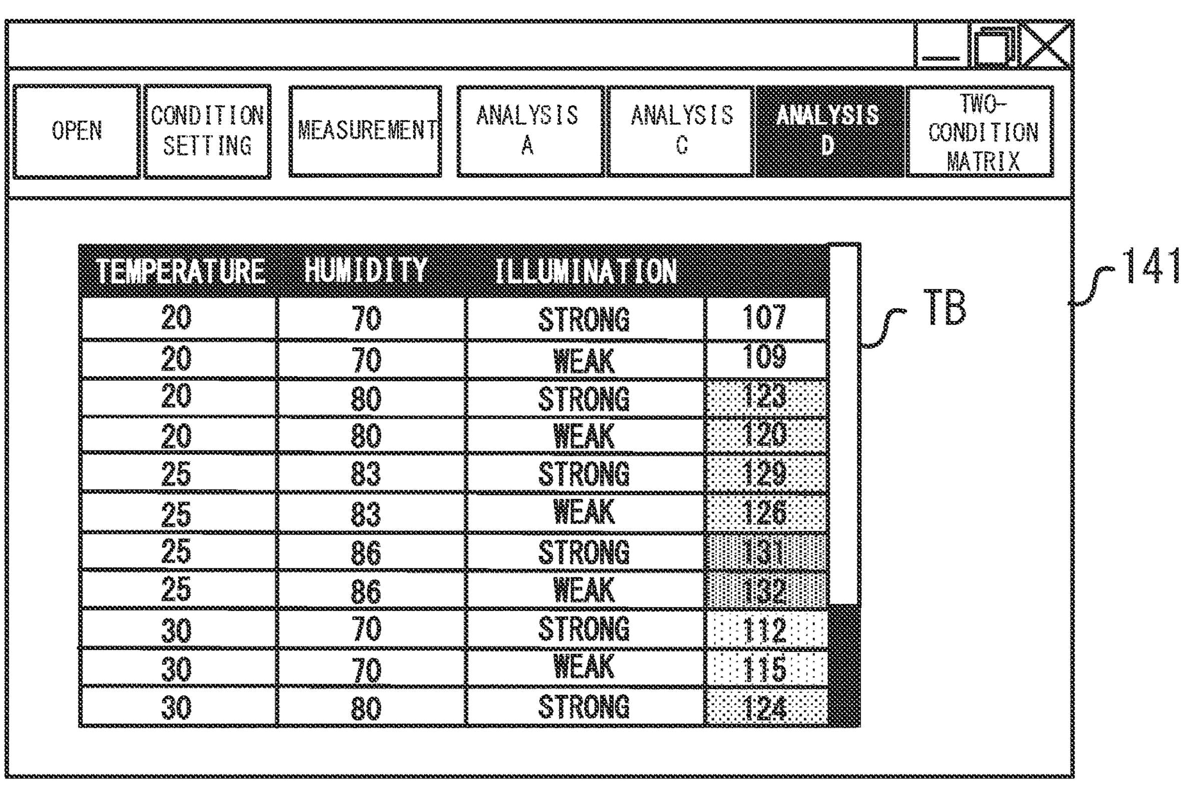
| TEMPERATURE | HUMIDITY | ILLUMINATION | |
|---|---|---|---|
| 20 | 70 | STRONG | 107 |
| 20 | 70 | WEAK | 109 |
| 20 | 80 | STRONG | 123 |
| 20 | 80 | WEAK | 120 |
| 25 | 83 | STRONG | 129 |
| 25 | 83 | WEAK | 126 |
| 25 | 86 | STRONG | 131 |
| 25 | 86 | WEAK | 132 |
| 30 | 70 | STRONG | 112 |
| 30 | 70 | WEAK | 115 |
| 30 | 80 | STRONG | 124 |
F I G. 2 4

EXPERIMENT SUPPORT APPARATUS, EXPERIMENT SUPPORT SYSTEM, EXPERIMENT SUPPORT METHOD, AND COMPUTER-READABLE MEDIUM

CROSS REFERENCE TO RELATED APPLICATIONS

This application is a Continuation Application of U.S. application Ser. No. 17/493,763, filed Oct. 4, 2021, which is based upon and claims the benefit of priority from prior Japanese Patent Application No. 2020-169376, filed Oct. 6, 2020, the entire contents of both of which are incorporated herein by this reference.

BACKGROUND OF THE INVENTION

Field of the Invention

The disclosure of this specification relates to an experiment support apparatus, an experiment support system, an experiment support method, and a computer-readable medium.

Description of the Related Art

Conditions for processing industrial products (including, for example, semiconductor components, electronic components, materials, metals, and automobile components) in sectors, such as of research and development, quality analysis, and manufacturing techniques are derived by measuring samples fabricated under various processing conditions through a measurement apparatus and by comparing measurement results with each other.

Such a method can be used also in bio-industries. For example, samples cultured under various different culture conditions, such as the frequency of medium replacement, the passage number, the temperature in an incubator, and the concentrations of oxygen and carbon dioxide, are imaged, and images of the samples are compared with each other, which can find out a desirable culture condition.

In these experiments performed for deriving conditions, first, an experiment plan is created, and is described in an experiment notebook. Subsequently, according to the experiment plan described in the experiment notebook, operations that include measuring samples using a measurement apparatus, arranging measurement results, and recording the results in the experiment notebook are repeated by an experimenter. In this case, back and forth movement repetitively occurring between the experiment notebook and the measurement apparatus is a factor of reducing the operation efficiency of the experimenter.

A technique related to such a problem is described in Japanese Patent Laid-Open No. 2016-011853, for example. Japanese Patent Laid-Open No. 2016-011853 describes a three-dimensional shape measurement apparatus that analyzes obtained multiple measurement data items by multiple analysis methods, and displays analysis results by the analysis methods with respect to each measurement data item in a juxtaposed manner.

SUMMARY OF THE INVENTION

An experiment support apparatus according to an embodiment of the present invention includes: one or more non-transitory computer-readable media that include an instruction; and one or more processors that execute the instruction, wherein the instruction is configured to cause the one or more processors to execute an operation, and the operation includes: causing a display device to display a condition table that indicates an experiment condition for measurement, in response to an input of the experiment condition; and causing the display device to display at least one of a measurement result based on measurement data, or an analysis result of the measurement data, in a cell of the condition table, in response to an input of the measurement data, the measurement data being obtained using a measurement apparatus under the experiment condition corresponding to the cell.

An experiment support system according to an embodiment of the present invention includes: the experiment support apparatus according to the aspect described above; and an measurement apparatus that outputs the measurement data to the experiment support apparatus.

An experiment support method according to an embodiment of the present invention includes: displaying a condition table that indicates an experiment condition for measurement, in response to an input of the experiment condition; and displaying at least one of a measurement result based on measurement data, or an analysis result of the measurement data, in a cell of the condition table, in response to an input of the measurement data, the measurement data being obtained using a measurement apparatus under the experiment condition corresponding to the cell.

A computer-readable medium according to an embodiment of the present invention is a non-transitory computer-readable medium storing a program, the program causes a computer to execute a process that includes: causing a display device to display a condition table that indicates an experiment condition for measurement, in response to an input of the experiment condition; and causing the display device to display at least one of a measurement result based on measurement data, or an analysis result of the measurement data, in a cell of the condition table, in response to an input of the measurement data, the measurement data being obtained using a measurement apparatus under the experiment condition corresponding to the cell.

BRIEF DESCRIPTION OF THE DRAWINGS

The present invention will be more apparent from the following detailed description when the accompanying drawings are referenced.

FIG. 1 exemplifies a configuration of an experiment support system 1;

FIG. 2 exemplifies a configuration of a measurement apparatus 200;

FIG. 5 is a flowchart showing another example of processes that the experiment support apparatus 100 performs;

FIG. 6 exemplifies a condition table TB;

FIG. 7 exemplifies a main screen 141;

FIG. 8 is a flowchart showing an example of a condition setting process;

FIG. 9 is a diagram for illustrating condition setting procedures;

FIG. 19 shows an example of the main screen 141 after measurement and analysis;

FIG. 21 shows still another example of the main screen 141 after measurement and analysis;

FIG. 23 shows still another example of the main screen 141 after measurement and analysis;

FIG. 24 shows yet another example of the main screen 141 after measurement and analysis;

DETAILED DESCRIPTION OF THE PREFERRED EMBODIMENTS

Figure 3:
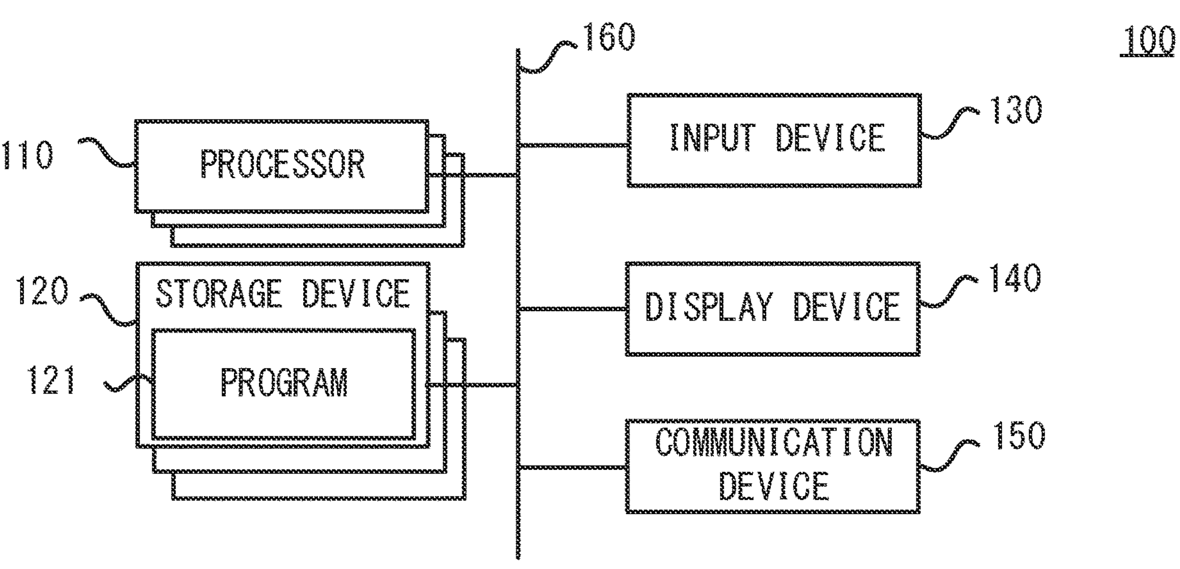
FIG. 3 exemplifies a configuration of an experiment support apparatus 100.

According to the technique described Japanese Patent Laid-Open No. 2016-011853, the measurement data items are analyzed by the analysis methods, and the analysis results are displayed in a juxtaposed manner, which can support discussion of the measurement data by the experimenter. However, even in the case of using the technique described in Japanese Patent Laid-Open No. 2016-011853, the experiment plan is still required to be managed with the experiment notebook. Accordingly, the operation load accompanying the back and forth movement between the experiment notebook and the apparatus is not reduced.

Given circumstances like the above, embodiments of the present invention will be described hereinafter.

FIG. 1 exemplifies a configuration of an experiment support system 1. As shown in FIG. 1, the experiment support system 1 includes an experiment support apparatus 100, and one or more measurement apparatuses (a measurement apparatus 200, a measurement apparatus 300, and a measurement apparatus 400) that output measurement data to the experiment support apparatus 100. The experiment support system 1 and the experiment support apparatus 100 are a system and an apparatus that support a measurement experiment of a sample or a specimen (each of which is, hereinafter, described as a specimen unless specifically discriminated), the experiment being repeated under different experiment conditions. The system and apparatus support execution of the measurement experiment, and discussion and evaluation of the measurement result and the experiment condition.

Specifically, the experiment support system 1 and the experiment support apparatus 100 create and manage a plan of the measurement experiment (hereinafter, simply described as an experiment plan), and lists a measurement result and/or an analysis result of measurement data. More specifically, the experiment support system 1 and the experiment support apparatus 100 create a condition table that indicates under which condition measurement is performed, and cause a display device to display the table. Furthermore, the experiment support system 1 and the experiment support apparatus 100 associate, with each cell of the created condition table, the measurement data measured under the experiment condition corresponding to the cell and/or analysis data generated based on the measurement data, thereby listing measurement results and/or analysis results on the condition table.

The condition table indicates the experiment conditions for measurement. According to the experiment support system 1 and the experiment support apparatus 100, the experimenter is not required to refer to the experiment notebook in order to confirm the experiment condition for measurement. According to the experiment support system 1 and the experiment support apparatus 100, the measurement results and/or analysis results are listed on the condition table. This negates the need to arrange and record the measurement results or analysis results in the experiment notebook. The measurement results, the analysis results, and the experiment conditions can be discussed without referring to the experiment notebook. As described above, the condition table can serve as at least part of the role of the conventional experiment notebook. Accordingly, the experimenter can omit reference to the experiment notebook, by referring to the condition table. Consequently, according to the experiment support system 1 and the experiment support apparatus 100, the efficiency of a series of operations in the experiment can be improved, which can reduce back and forth movement between the experiment notebook and the apparatus to the minimum. As a result, the load on the experimenter can be reduced.

The measurement data in this specification is data generated by the measurement apparatus performing measurement. The measurement result is information displayed by the display device, based on the measurement data. For example, in a case where the measurement data is image data, the measurement result is an image displayed based on the image data. The analysis data in this specification is data generated through the experiment support apparatus by analyzing the measurement data by a predetermined analysis method. The analysis result is information displayed by the display device on the basis of the analysis data. For example, in the case where the measurement data is image data, the analysis data is a representative value or the like that represents an image obtained by analyzing the image data, and the analysis result is an image obtained by visualizing the representative value with a symbol such as a numeral, a color, a concentration, etc.

The experiment conditions are general conditions required to replicate the measurement result obtained by a measurement experiment or the analysis result. The experiment conditions include conditions about specimens (hereinafter described as specimen conditions), conditions about measurement apparatuses (hereinafter described as apparatus conditions), and conditions about the experiment environment other than the specimens or apparatuses (described as environmental conditions). The specimen conditions include processing conditions (e.g., the temperature, humidity, processing speed, processing time period, etc., in processing the product) in the case where the specimens are processed products. The specimen conditions also include the component conditions of specimens (e.g., the amounts of specific components contained in specimens, content ratios, etc.). The apparatus conditions include various types of settings of the apparatuses. The apparatus conditions include imaging conditions (e.g., the illumination intensity, exposure time period, imaging magnification, etc.) in the case of an imaging apparatus. The environmental conditions include conditions that identify the environment where specimens and/or the measurement apparatus are disposed. The environmental conditions include the intensity (brightness) of ambient light during measurement in the case where optical measurement is performed by the measurement apparatus.

FIG. 2 exemplifies the configuration of the measurement apparatus 200. The measurement apparatus 200, which is an example of the measurement apparatus that generates measurement data, is a microscope apparatus that obtains image data on specimens, and more specifically, a laser scanning microscope apparatus. That is, the measurement apparatuses that are included in the experiment support system 1, or output measurement data to the experiment support apparatus 100 may include a microscope apparatus. The measurement apparatuses may include a laser scanning microscope apparatus. The experiment support system 1, which includes the measurement apparatus 200 and the experiment support apparatus 100, may be a laser scanning microscope system. Hereinafter, referring to FIG. 2, the configuration of the measurement apparatus 200 is specifically described.

The measurement apparatus 200 includes a laser light source 201, a polarization beam splitter (hereinafter described as a PBS) 202, a scanning unit 203 that is scanning means for scanning a specimen 206, a ¼ λ plate 204, an objective lens 205, an imaging lens 207, a pinhole plate 208, an optical detector 209, an AD converter 210, a revolver 211, an X-Y stage 214, a white light source 215, an imaging lens 216, and a camera 217.

The revolver 211 is means for switching the objective lens 205, and also functions as means for changing the relative distance between the objective lens 205 and the specimen 206. That is, in the experiment support system 1, the revolver 211 is an example of scanning means for scanning the specimen 206 in the optical axis direction of the objective lens 205. The scanning unit 203 is an example of scanning means for scanning the specimen 206 in a direction orthogonal to the optical axis. The X-Y stage 214 is an example of means for moving the specimen 206 in the direction orthogonal to the optical axis of the objective lens 205 relative to this objective lens 205.

Laser light output from the laser light source 201 passes through the PBS 202, and subsequently enters the scanning unit 203. The scanning unit 203 includes, for example, a galvanoscanner and a resonant scanner that can scan with light in directions orthogonal to each other. The laser light deflected by the scanning unit 203 is converted from linear polarization into circular polarization by the ¼ λ plate 204, and is subsequently emitted to the specimen 206 through the objective lens 205 attached to the revolver 211.

In the measurement apparatus 200, the pair of scanners included in the scanning unit 203 are arranged at the position optically conjugate with the pupil position of the objective lens 205 or adjacent thereto. Accordingly, the scanning unit 203 deflects the laser light, which moves the laser light condensing position on the focal plane of the objective lens 205 in the XY direction orthogonal to the optical axis of the objective lens. Accordingly, the specimen 206 is two-dimensionally scanned with the laser light.

Here, two-dimensional scanning (XY scanning) by the scanning unit 203, and driving (Z scanning) of the revolver 211 in the optical axis direction (Z direction) of the objective lens 205 are controlled by the experiment support apparatus 100 that controls the measurement apparatus 200. That is, the experiment support apparatus 100 is an example of the scanning control means for controlling the scanning means. Note that the two-dimensionally scanning method by the scanning unit 203 is not specifically limited. For example, raster scanning, which is typically used by a confocal microscope, may be adopted. Switching of the objective lens 205 disposed on the optical path of the measurement apparatus 200 by rotational driving of the revolver 211, and driving of the X-Y stage 214 in the direction (XY direction) orthogonal to the optical axis of the objective lens 205 are also controlled by the experiment support apparatus 100.

Laser light reflected by the surface of the specimen 206 (hereinafter described as reflected light) passes through the objective lens 205, enters the ¼ λ plate 204, is converted by this plate from circular polarization into linear polarization, and subsequently passes through the scanning unit 203 and enters the PBS 202. At this time, the reflected light entering the PBS 202 has a polarization plane orthogonal to the polarization plane of laser light entering the PBS 202 from the laser light source 201 side. Accordingly, the reflected light is reflected by the PBS 202 and is guided to the imaging lens 207.

The imaging lens 207 condenses the reflected light reflected by the PBS 202. On the pinhole plate 208 provided on the reflection optical path from the PBS 202, a pinhole is formed on a position optically conjugate with the condensing position of laser light formed on the focal plane of the objective lens 205. Accordingly, in a case where a certain portion on the surface of the specimen 206 is at the condensing position of laser light by the objective lens 205, reflected light from this portion is condensed at the pinhole, and passes through this pinhole. On the other hand, in a case where the certain portion on the surface of the specimen 206 deviates from the condensing position of laser light by the objective lens 205, reflected light from this portion is not condensed at the pinhole. Accordingly, the reflected light does not pass through the pinhole, and is blocked by the pinhole plate 208.

The light having passed through the pinhole is detected by the optical detector 209. The optical detector 209 is, for example, a photomultiplier tube (PMT). The optical detector 209 receives the light having passed through the pinhole, i.e., reflected light from a portion matching the condensing position of the laser light by the objective lens 205 on the surface of the specimen 206. A detection signal having an intensity according to the amount of received light is output as a luminance signal indicating the luminance of this portion. The luminance signal, which is an analog signal, is analog/digital-converted by the AD converter 210, and then input, as luminance value information indicating the luminance of this portion, into the experiment support apparatus 100. That is, the measurement apparatus 200 outputs, to the experiment support apparatus 100, the measurement data that includes the luminance value information and scanning position information from the scanning unit 203. Note that in this case, the measurement data is confocal image data that is a set of luminance values at corresponding coordinates. The experiment support apparatus 100 can display a confocal image that is an example of a measurement result, based on the measurement data obtained from the measurement apparatus 200.

On the other hand, light (white light) emitted from the white light source 215 is condensed at the pupil position of the objective lens 205 attached to the revolver 211, and subsequently is emitted to the specimen 206. Accordingly, the specimen 206 is illuminated by the Köhler illumination method. Reflected light reflected by the surface of the specimen 206 enters the imaging lens 216. The imaging lens 216 condenses the reflected light on the light receiving surface of the camera 217.

The camera 217 is a camera that includes the light receiving surface at the position optically conjugate with the focal plane of the objective lens 205, and is, for example, a color CCD (Charge-Coupled Device) camera that includes a CCD image sensor, and a color CMOS (complementary MOS) camera that includes a CMOS image sensor. The camera 217 images the specimen 206 using reflected light condensed on the light receiving surface, and outputs non-confocal image data obtained by imaging, to the experiment support apparatus 100. That is, the measurement apparatus 200 outputs measurement data that is non-confocal image data on the specimen 206, to the experiment support apparatus 100. Note that in this case, the measurement data is non-confocal image data that is a set of pieces of color information at the corresponding coordinates. The experiment support apparatus 100 can display a non-confocal image that is an example of a measurement result, based on the measurement data obtained from the measurement apparatus 200.

FIG. 3 exemplifies the configuration of the experiment support apparatus 100. The experiment support apparatus 100, which is an example of the experiment support apparatus that obtains measurement data from the measurement apparatus, is a microscope control apparatus that constitutes a microscope system together with the measurement apparatus 200, which is the microscope apparatus. Note that the experiment support apparatus that obtains measurement data from the measurement apparatus does not necessarily control the measurement apparatus. The measurement apparatus may be controlled by an apparatus different from the experiment support apparatus. Hereinafter, referring to FIG. 3, the configuration of the experiment support apparatus 100 is specifically described.

The experiment support apparatus 100 is an apparatus that controls the measurement apparatus, and obtains measurement data generated by this measurement apparatus. Specifically, the experiment support apparatus 100 controls imaging of the specimen by the measurement apparatus 200, and obtains, from this measurement apparatus 200, the measurement data obtained by the imaging. Note that the experiment support apparatus 100 may be any computer that includes one or more non-transitory computer-readable media that include an instruction, and one or more processors that execute the instruction. The instruction may be configured to cause the one or more processors to execute a predetermined operation.

More specifically, as shown in FIG. 3, the experiment support apparatus 100 may include, for example, one or more processors 110, one or more storage devices 120, an input device 130, a display device 140, and a communication device 150, which may be connected to each other via a bus 160.

Each of the one or more processors 110 is, for example, hardware that includes a CPU (central processing unit), a GPU (graphics processing unit), and a DSP (digital signal processor), and executes a program 121 stored in the one or more storage devices 120, thereby performing programmed processes. The one or more processors 110 may include an ASIC (application specific integrated circuit), and an FPGA (field-programmable gate array).

Each of the one or more storage devices 120 includes, for example, one or more freely selected semiconductor memories, and may further include one or more other storage devices. The semiconductor memories include, for example, volatile memories such as RAMs (random access memories), and nonvolatile memories such as ROMs (read only memories), programmable ROMs and flash memories. The RAMs may include, for example, DRAMs (dynamic random access memories), and SRAMs (static random access memories). The other storage devices may include, for example, magnetic storage devices that include magnetic disks, and optical storage devices that include optical disks.

Note that the one or more storage devices 120 are non-transitory computer-readable media, and are an example of storage units of the experiment support system 1. At least one of the storage devices 120 stores the measurement data obtained from the measurement apparatus.

The input device 130 is a device that the experimenter directly operates, and is, for example, a keyboard, a mouse, a touch panel, etc. The display device 140 may be, for example, a liquid crystal display, an organic EL display, a CRT (cathode ray tube) display, etc. The display may internally include a touch panel. The communication device 150 may be a wired communication module, or a wireless communication module.

Note that the configuration shown in FIG. 3 is an example of the hardware configuration of the experiment support apparatus 100. The experiment support apparatus 100 is not limited to this configuration. The experiment support apparatus 100 is not limited to a general purpose apparatus, but may be a dedicated apparatus. The experiment support apparatus 100 may be configured integrally with the measurement apparatus 200. That is, the experiment support system 1 may be made up of a single apparatus, or include multiple apparatuses.

The experiment support apparatus 100 configured as described above may cause the processors 110 to execute the program 121, thereby generating image data in various formats indicating measurement results, based on confocal image data or non-confocal image data that is measurement data output from the measurement apparatus 200, and displaying the measurement results in various formats on the display device 140.

For example, the experiment support apparatus 100 may control the measurement apparatus 200 to change the relative distance between the specimen 206 and the objective lens 205, or obtain confocal image data and non-confocal image data from the measurement apparatus 200 every time the relative distance changes by a predetermined value. Subsequently, the experiment support apparatus 100 may compare the luminance values of pixels having the same coordinates between obtained image data items (pixels having the same coordinates on the plane orthogonal to the Z direction). The maximum luminance value, and position information in the Z direction (height information) when image data having the maximum luminance value is obtained may be detected on a pixel-by-pixel basis. The experiment support apparatus 100 may generate three-dimensional (3D) data, such as laser extended image data, color extended image data, and height image data, based on the multiple image data items, the maximum luminance value on a pixel-by-pixel basis, and the height information.

Note that the laser extended image data is data on an extended focus image generated based on multiple confocal image data items. Note that the color extended image data is data on an extended focus image generated based on multiple non-confocal image data items. Furthermore, the height image data is data on an image that is generated based on multiple confocal image data items and represents the heights with colors in a color table and with grayscales. The experiment support apparatus 100 may two-dimensionally and/or three-dimensionally display the images as measurement results, based on these image data items.

Furthermore, the experiment support apparatus 100 may control the measurement apparatus 200 so as to image multiple regions of the specimen 206 that have coordinates different from each other in the direction orthogonal to the optical axis of the objective lens 205. Furthermore, the measurement apparatus 200 may be controlled so as to perform imaging at multiple positions having coordinates different from each other in the optical axis direction, in each region. Moreover, the experiment support apparatus 100 may generate map image data, based on confocal image data items and non-confocal image data items obtained by imaging.

Note that the map image data is data on an image made by pasting different image data items generated based on multiple confocal image data items or multiple non-confocal image data items. The experiment support apparatus 100 may two-dimensionally and/or three-dimensionally display the map image as the measurement result, based on the map image data.

Figure 4:
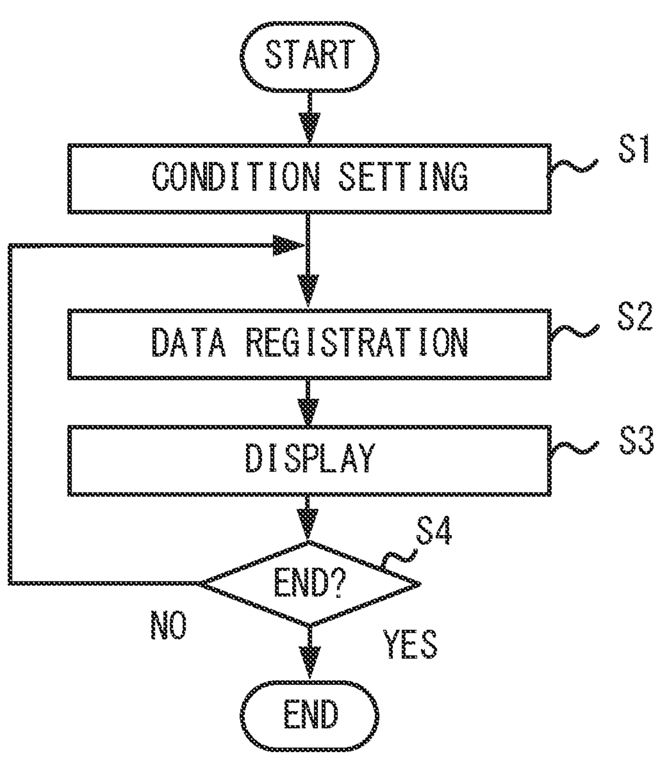
FIG. 4 is a flowchart showing an example of processes that the experiment support apparatus 100 performs.

FIG. 4 is a flowchart showing an example of processes that the experiment support apparatus 100 performs. FIG. 5 is a flowchart showing another example of processes that the experiment support apparatus 100 performs. FIG. 6 exemplifies a condition table TB. Hereinafter, referring to FIGS. 4 to 6, an experiment support method performed in the experiment support apparatus 100 is described. Note that the processes shown in FIGS. 4 and 5 are examples of the experiment support method, and for example, are performed by the processors 110 executing the program 121.

When the processes shown in FIG. 4 are started, the experimenter uses the input device 130 to input a preliminarily discussed experiment condition into the experiment support apparatus 100. The experiment support apparatus 100 detects the input by the experimenter, and performs condition setting (step S1). More specifically, the processors 110 create a condition table in response to the input of the experiment condition, and causes the display device 140 to display the created condition table.

Here, the condition table is a table indicating an experiment condition for measurement (including a combination of multiple experiment conditions). The condition table includes one or more dedicated regions (cells) for the respective experiment conditions. Although not specifically limited, the table is typically a two-dimensional table (matrix). The input of the experiment condition is, for example, an input of the number of experiment conditions, an input of the name of the experiment condition, an input of a value of the experiment condition, or a combination of these inputs. The number of experiment conditions is the number of these experiment conditions, more specifically, the number of types of experiment conditions. The value of the experiment condition can include a numerical value, or a character string.

After the condition setting is finished, the experiment support apparatus 100 registers data in the cell of the condition table (step S2). More specifically, the processors 110 register measurement data obtained using the measurement apparatus 200 under the experiment condition corresponding to the cell of the condition table selected by the experimenter, in this cell. That is, the processors 110 associate the measurement data with the cell of the condition table. Note that the measurement data to be registered in the cell may be measurement data preliminarily obtained using the measurement apparatus 200 before the cell is selected, or measurement data obtained using the measurement apparatus 200 by the experiment support apparatus 100 controlling the measurement apparatus 200 after the cell is selected.

Further alternatively, the experiment support apparatus 100 may obtain the measurement data by this experiment support apparatus 100 controlling the measurement apparatus 200 after the cell is selected, and then gives a file name of the obtained measurement data using the experiment condition during measurement (i.e., the experiment condition corresponding to the cell). When the measurement data preliminarily obtained before the cell is selected is registered in the cell, the experiment support apparatus 100 may rename the file name of the measurement data using the experiment condition during measurement. That is, in step S2, the experiment support apparatus 100 may give a file name of the measurement data obtained using the measurement apparatus 200 under the experiment condition corresponding to the cell of the condition table, using the experiment condition when the measurement data is obtained.

After the data is registered in the cell of the condition table, the experiment support apparatus 100 displays the measurement result in the cell (step S3). More specifically, the processors 110 cause the display device 140 to display the measurement result based on the measurement data registered in step S2, in the cell where the measurement data is registered in step S2. In other words, in step S3, the processors 110 cause the display device 140 to display the measurement result based on the measurement data, in the cell, in response to an input of the measurement data obtained using the measurement apparatus 200 under the experiment condition corresponding to the cell of the condition table.

Subsequently, the experiment support apparatus 100 determines presence or absence of an end instruction (step S4). If the end instruction is absent (NO in step S4), this apparatus repeats the processes in steps S2 and S3. Accordingly, every time the measurement data is registered in the cell of the condition table, the measurement result based on the measurement data measured under the experiment condition corresponding to the cell is added. That is, every time the measurement data obtained using the measurement apparatus 200 is input, the processors 110 cause the display device 140 to update the display of the condition table.

The experiment support apparatus 100 may perform the processes shown in FIG. 5 instead of the processes shown in FIG. 4. When the processes shown in FIG. 5 are started, the experimenter uses the input device 130 to input a preliminarily discussed experiment condition into the experiment support apparatus 100. The experiment support apparatus 100 detects an input by the experimenter, performs condition setting (step S11), and registers data in the cell of the created condition table (step S12). Note that the processes in steps S11 and S12 are similar to the processes in steps S1 and S2 of FIG. 4.

After the data is registered in the cell of the condition table, the experiment support apparatus 100 analyzes the registered measurement data (step S13). More specifically, the processors 110 analyze the measurement data using one or more analysis methods, and generate analysis data indicating an analysis result. The one or more analysis methods may be explicitly designated by the experimenter. Alternatively, one or more analysis methods determined based on a previous analysis history in the experiment support apparatus 100 or the like may be designated for the measurement data.

The analysis data generated in step S13 may be registered in the cell together with the measurement data. That is, the processors 110 may associate the measurement data and the analysis data with the cell of the condition table. Further alternatively, in step S13, the experiment support apparatus 100 may give a file name of the analysis data using the experiment condition when the measurement data corresponding to the analysis data is obtained, or give a file name of the analysis data using the experiment condition and the name of the analysis method used for the analysis.

After the analysis of the measurement data is finished, the experiment support apparatus 100 color-codes the cells where the measurement data and the analysis data are registered (step S14). Specifically, the processors 110 determine a color to be assigned to the cell where the analysis data is registered, based on the analysis data generated in step S13, thereby color-coding the cells in the condition table. More specifically, the processors 110 may determine colors to be assigned to the cells depending on the values of the analysis data. For example, the higher the value is, the color of the cell transitions to warm colors, such as red. The lower the value is, the color of the cell transitions to cold colors, such as blue. According to certain color-coding, different colors may be assigned to cells depending on the difference in hue. Different colors may be assigned to cells depending on the difference in brightness. Different colors may be assigned to cells depending on difference in the combination of the hue and brightness. The colors include chromatic colors, and achromatic colors. That is, color-coding may be performed according to the grayscale.

After color-coding is finished, the experiment support apparatus 100 displays, in the cell, at least one of the measurement result and the analysis result (step S15). More specifically, the processors 110 cause the display device 140 to display at least one of the measurement result based on the measurement data registered in step S12, and the analysis result based on the analysis data generated in step S13, in the cell where the measurement data and/or the analysis data are registered. At this time, the color of the cell (more specifically, the background color of the cell) is displayed as the color determined by color-coding in step S14.

Subsequently, the experiment support apparatus 100 determines presence or absence of an end instruction (step S16). If the end instruction is absent (NO in step S16), this apparatus repeats the processes in steps S12 to S15. Accordingly, every time the measurement data and the analysis data are registered in the cell of the condition table, at least one of the measurement result based on the measurement data measured under the experiment condition corresponding to the cell, and on the analysis result, is additionally displayed. Note that hereinafter, in a case where the measurement result and the analysis result are not specifically discriminated, these are collectively called an experiment result.

The experiment support apparatus 100 executes the experiment support method shown in FIG. 4 or 5, which can create the condition table TB that includes cells for the respective experiment conditions for measurement as shown in FIG. 6, and lists the experiment results in the condition table TB. Accordingly, as shown in FIG. 6, the experimenter can recognize whether the experiment conditions for measurement are experiment conditions for which measurement has already been made or experiment conditions for which measurement has not been performed yet, in a discriminated manner, by referring to the condition table TB. Accordingly, without reference to the experiment notebook, the experiment condition for measurement to be newly performed by the experimenter can be identified, and the experiment can be effectively continued. The experiment condition for measurement becomes less likely to be overlooked. Accordingly, measurement can be preventively avoided from being overlooked.

The experiment result is listed. Accordingly, the tendency of the experiment result and the abnormality caused by the difference in experiment condition can be easily grasped. Furthermore, every time data is registered in the cell, the display of the condition table is updated. Accordingly, the experiment results obtained while the measurement data is obtained can be evaluated as needed. Consequently, before measurement under all the experiment conditions is finished, presence or absence of the correlation between a specific experiment condition and an experiment result can be predicted. In particular, the experiment support method shown in FIG. 5 is executed, which color-codes the cells of the condition table shown in FIG. 6. Consequently, presence or absence of the relationship between a specific experiment condition and an experiment result can be more directly grasped. Accordingly, the necessity of measurement under each experiment condition in consideration of the experiment result can be determined easily and early. For example, the operation load on the experimenter can be reduced by omitting measurement under a combination of experiment conditions where only experiment conditions with no correlation are different. As described above, according to the experiment support apparatus 100 and the experiment support system 1, back and forth movement between the experiment notebook and the apparatus can be significantly reduced. Accordingly, the efficiency of the series of operations in the experiment can be improved.

Note that FIG. 4 shows the example where the measurement data is registered in the cells. FIG. 5 shows the example where the measurement data and the analysis data are registered in the cells. However, it is only required that at least one of the measurement data and the analysis data is registered in the cell. As a result, it is only required that at least one of the measurement result and the analysis result is displayed in the cell. Consequently, only the analysis data may be registered in the cell, or only the analysis result may be displayed. At least one of one or more measurement data items and one or more analysis data items may be registered in each cell. Consequently, multiple measurement data items measured under the same experiment condition may be registered in each cell. Any measurement result among the registered measurement data items may be displayed in each cell. Multiple measurement results may be displayed in each cell. Multiple analysis data items may be registered in each cell. Any analysis result among the registered analysis data items may be displayed in each cell. Multiple analysis results may be displayed in each cell. One or more new analysis results (e.g., the average value, mode value, medium value, maximum value, minimum value, etc.) calculated using multiple analysis results may be displayed in each cell.

Figure 10:
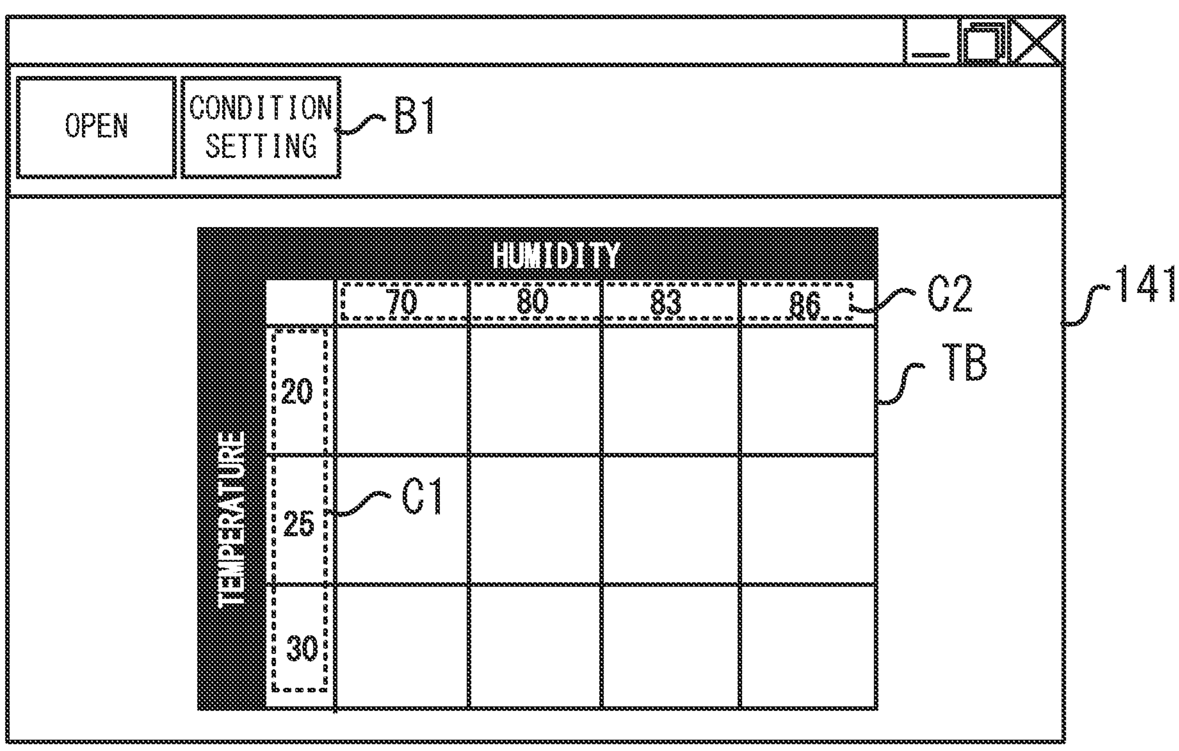
FIG. 10 exemplifies a main screen 141 where the condition table TB that is a two-condition matrix is created.
Figure 11:
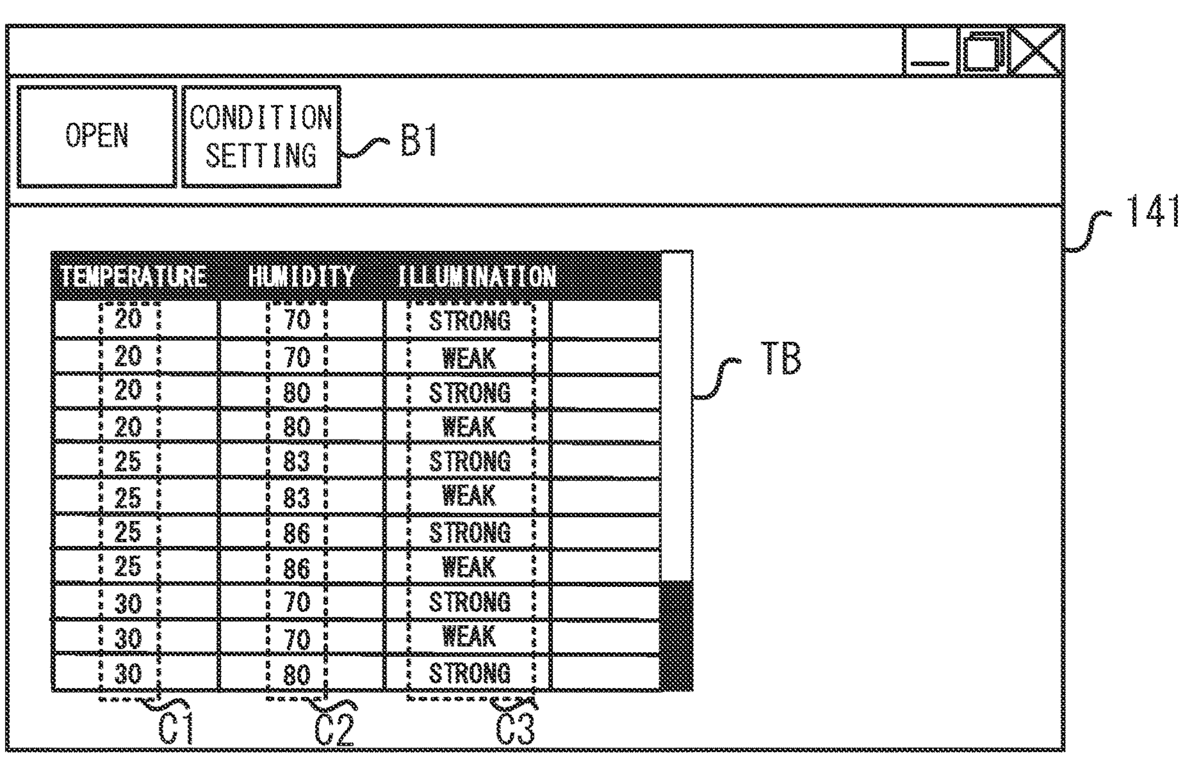
FIG. 11 exemplifies a main screen 141 where the condition table TB that is a condition list matrix is created.

The processes in the steps in the experiment support method shown in FIG. 5 are described further in detail. FIG. 7 exemplifies a main screen 141. FIG. 8 is a flowchart showing an example of a condition setting process. FIG. 9 is a diagram for illustrating condition setting procedures. FIG. 10 exemplifies the main screen 141 where the condition table TB that is a two-condition matrix is created. FIG. 11 exemplifies the main screen 141 where the condition table TB that is a condition list matrix is created. Hereinafter, referring to FIGS. 7 to 11, the color-coding process in step S11 of FIG. 5 is described further in detail.

When the processors 110 of the experiment support apparatus 100 execute the experiment support application program (hereinafter simply described as a program), the main screen 141 shown in FIG. 7 is displayed by the display device 140. The condition setting process shown in FIG. 8 is started by the experimenter pressing a condition setting button (button B1) on the main screen 141, for example.

When the process shown in FIG. 8 is started, the processors 110 first cause the display device 140 to display a condition setting screen 142 shown in FIG. 9 (step S21). Subsequently, the processors 110 obtain the experiment condition input by the experimenter through the condition setting screen 142 (step S22). As shown in FIG. 9, the experimenter can designate the number of conditions that is the number of experiment conditions designated with respect to each measurement data item on the condition setting screen 142. When the experimenter designates the number of conditions on the condition setting screen 142, the processors 110 obtain the number of designated conditions. As shown in FIG. 9, the experimenter can designate a condition name and condition values in an input region 142*a*. When the experimenter designates the condition name and the condition values in the input region 142*a*, the processors 110 obtain the designated condition name and condition values.

Subsequently, the processors 110 determine the number of designated conditions (step S23), create the condition table in a format depending on the number of conditions (steps S24 and S25), and cause the display device 140 to display the created table on the main screen 141 (step S26).

Specifically, when determining that the number of conditions is two in step S23, the processors 110 create a two-condition matrix table as the condition table (step S24), and cause the display device 140 to display the created two-condition matrix table on the main screen 141 (step S26). More specifically, when the processors 110 determine that the number of conditions is two, two cells where condition names are input in the input region 142*a*, and multiple cells where condition values are input for each condition name are created, as shown in FIG. 9, thus prompting the experimenter to input the condition name and the condition values. Subsequently, when the experimenter inputs the condition names (the temperature and humidity in FIG. 9) and the condition values (20, 25 and 30 as temperature condition values, and 70, 80, 83 and 86 as humidity condition values in FIG. 9), the processors 110 create the condition table TB that is the two-condition matrix, and cause the display device 140 to display the condition table TB on the main screen 141 as shown in FIG. 10.

In a case where the one of the two experiment conditions designated for each measurement data item is adopted as a first experiment condition, and the other is adopted as a second experiment condition, the two-condition matrix table is a condition table where a set C1 of values of the first experiment condition, and a set C2 of values of the second experiment condition are arranged so as to intersect each other. Note that FIG. 10 shows an example where the set C1 and the set C2 are arranged orthogonal to each other.

Preferably, in the two-condition matrix table, the values of the first experiment condition are arranged in an order of numerical values or degrees of the values of the first experiment condition. Preferably, the values of the second experiment condition are arranged in an order of numerical values or degrees of the values of the second experiment condition. Note that FIG. 10 shows the example where the values of the first experiment condition (temperature) are arranged in an ascending order of the numerical values (an order of 20, 25 and 30), and the values of the second experiment condition (humidity) are arranged in an ascending order of the numerical values (an order of 70, 80, 83 and 86).

On the other hand, when the processors 110 determine that the number of conditions is other than two in step S23, a condition list matrix table is created (step S25), and cause the display device 140 to display the created condition list matrix table on the main screen 141 (step S26). More specifically, when the processors 110 determine that the number of conditions is other than two, cells which are as many as the number of conditions and in which condition names are input in the input region 142*a*, and multiple cells where condition values are input for each condition name are created, thus prompting the experimenter to input the condition name and the condition values. Subsequently, when the experimenter inputs the condition names (e.g., the temperature, humidity and illumination) and the condition values (e.g., 20, 25 and 30 as temperature condition values, 70, 80, 83 and 86 as humidity condition values, and "STRONG" and "WEAK" as illumination condition values), the processors 110 create the condition table TB that is the condition list matrix table, and cause the display device 140 to display the condition table TB on the main screen 141 as shown in FIG. 11.

Note that the condition list matrix table is a condition table where sets of values of one or more experiment conditions designated for individual measurement data items are arranged so as not to intersect each other. Note that FIG. 11 shows the example where a set C1 of values of a first experiment condition, a set C2 of values of a second experiment condition, and a set C3 of values of a third experiment condition are arranged parallel with each other.

Preferably, in the condition list matrix table, the value of at least one experiment condition among the one or more experiment conditions is arranged in an order of numerical values or degrees of values of the at least one experiment condition. Note that FIG. 11 shows the example where the values of the first experiment condition (temperature) are arranged in an ascending order of the numerical values (an order of 20, 25 and 30).

Figure 12:
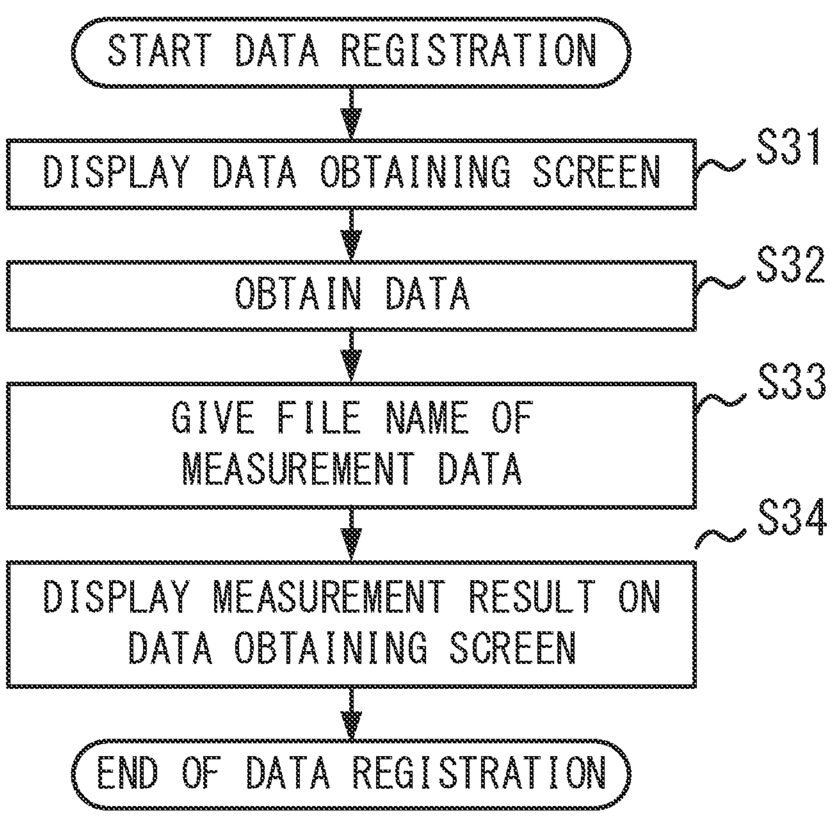
FIG. 12 is a flowchart showing an example of a data registration process.
Figure 13:
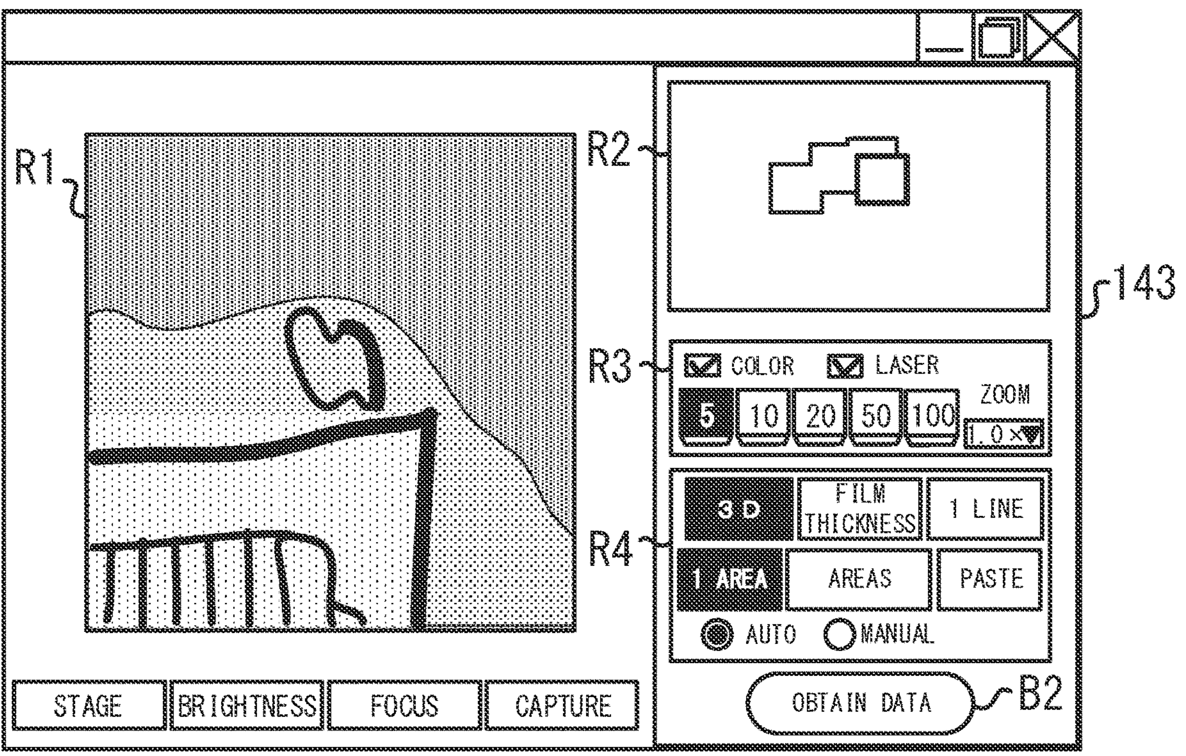
FIG. 13 exemplifies a data obtaining screen 143 before data is obtained.
Figure 14:
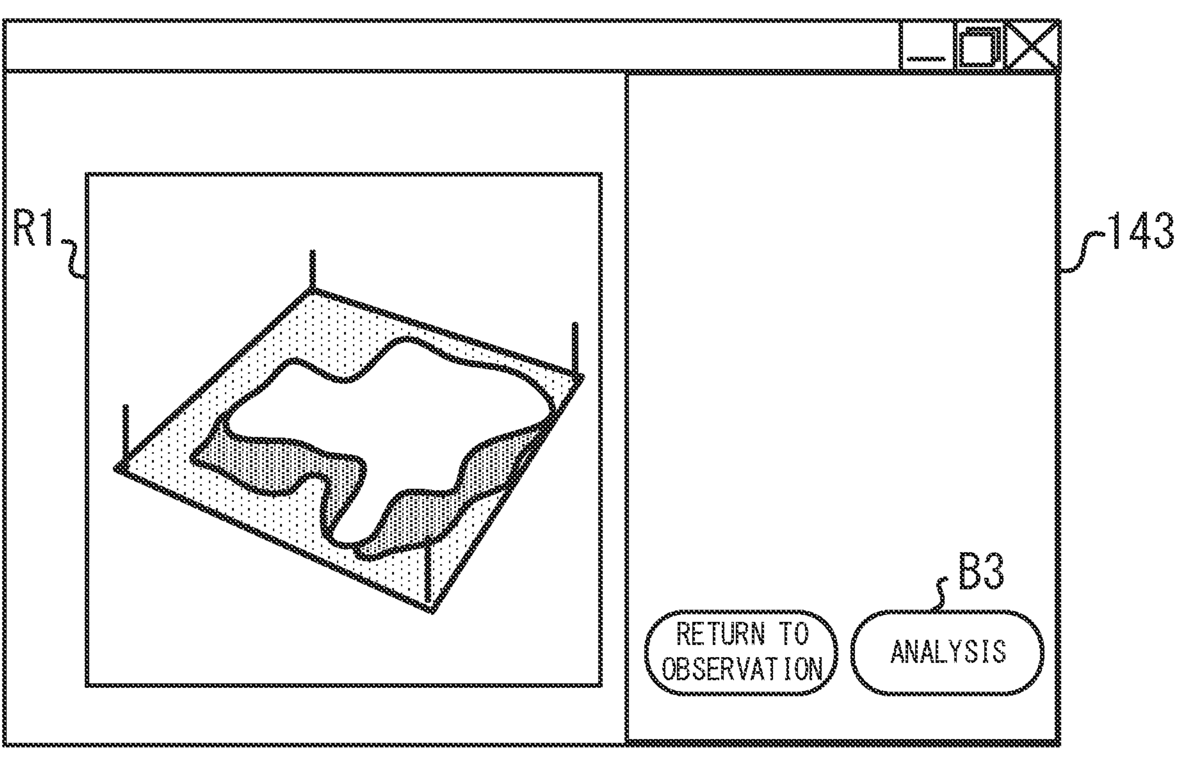
FIG. 14 exemplifies a data obtaining screen 143 after data is obtained.

FIG. 12 is a flowchart showing an example of a data registration process. FIG. 13 exemplifies a data obtaining screen 143 before data is obtained. FIG. 14 exemplifies a data obtaining screen 143 after data is obtained. Hereinafter, referring to FIGS. 12 to 14, the data registration process in step S12 of FIG. 5 is described further in detail.

The data registration process shown in FIG. 12 is started by, for example, the experimenter selecting the cell of the condition table displayed on the main screen 141. More specifically, the process is performed by selecting a blank cell of the two-condition matrix table shown in FIG. 10, or a blank cell of the condition list matrix table shown in FIG. 11. Before or after the experimenter selects the cell, the specimen 206 matching the selected cell or the experiment condition corresponding to the selected cell is arranged on the X-Y stage 214 of the measurement apparatus 200.

When the process shown in FIG. 12 is started, the processors 110 first cause the display device 140 to display a data obtaining screen 143 shown in FIG. 13 (step S31). The data obtaining screen 143 includes: a region R1 where an image is displayed based on image data obtained by the measurement apparatus 200; a region R2 where a map image and a current observation position are displayed; a region R3 where setting of observation using the measurement apparatus 200 is performed; and a region R4 where setting of a data obtaining process to be performed after a button B2 is pressed is performed.

Note that in FIG. 12, a live image is displayed in the region R1. In the region R3, a setting example is indicated where the measurement apparatus 200 obtains both non-confocal image data (color) and confocal image data (laser) using a 5× objective lens (zoom magnification of one). In the region R4, a setting example is indicated where 3D data (laser extended image data, color extended image data, height image data) is automatically obtained for one area.

When the button B2 is pressed after the experimenter performs required setting on the data obtaining screen 143, the processors 110 obtain measurement data (step S32). Specifically, the processors 110 control the measurement apparatus 200, and the measurement apparatus 200 measures the specimen 206 under control by the processors 110. The processors 110 then obtain the measurement data obtained by measurement, from the measurement apparatus 200. More specifically, the measurement apparatus 200 performs z-stack imaging that generates image data in each of states where the relative distances between the specimen 206 and the objective lens 205 are different, and outputs, as measurement data, multiple confocal image data items and multiple non-confocal image data items to the experiment support apparatus 100. The experiment support apparatus 100 obtains these image data items as measurement data.

The processors 110 having obtained the measurement data give the file name of measurement data using the experiment condition corresponding to the cell (step S33). For example, the processors 110 may give the file name of the measurement data obtained under the experiment condition with the temperature of 20 and the humidity of 70, as "temperature 20 humidity 70", and store the name in the storage devices 120.

Subsequently, the processors 110 cause the display device 140 to display, on the data obtaining screen 143, the measurement result based on the measurement data stored in the storage devices 120 (step S34). More specifically, as shown in FIG. 14, the processors 110 cause the display device 140 to display the measurement result in the region R1 of the data obtaining screen 143. Note that FIG. 14 shows the example where a laser extended image is three-dimensionally displayed as the measurement result. However, the measurement result is not limited to this example. A color extended image or a height image may be displayed as a measurement result.

The experimenter may confirm the displayed measurement result, and select whether to perform analysis or not. In a case where the measurement data is analyzed, the experimenter presses a button B3 displayed on the data obtaining screen 143, for example. In a case where analysis is not performed, the experimenter may observe the specimen 206 again, and reacquire measurement data.

Figure 15:
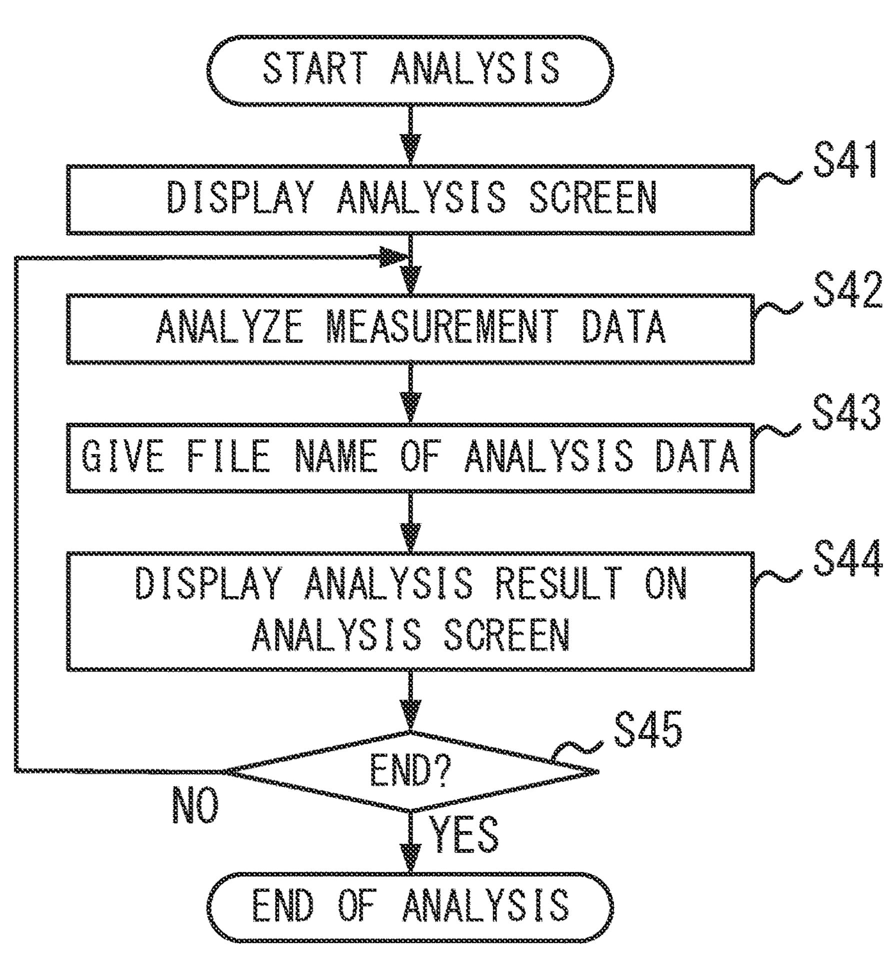
FIG. 15 is a flowchart showing an example of an analysis process.
Figure 16:
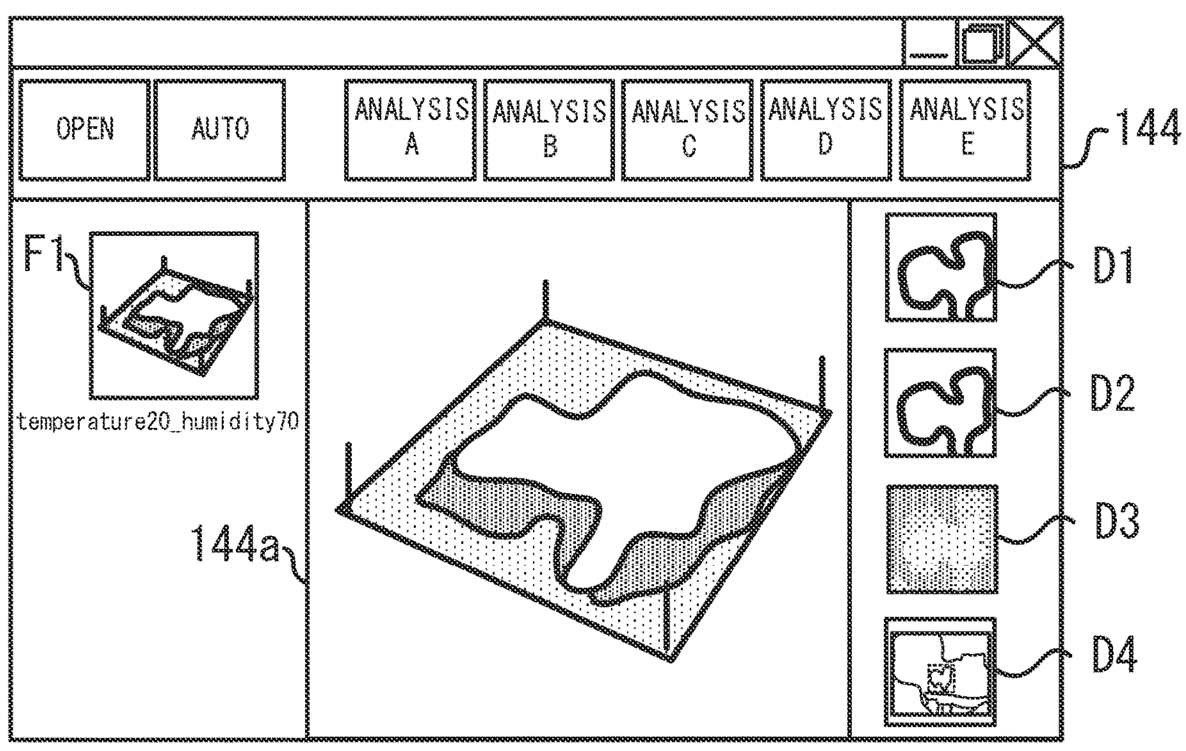
FIG. 16 exemplifies an analysis screen 144 before analysis.
Figure 17:
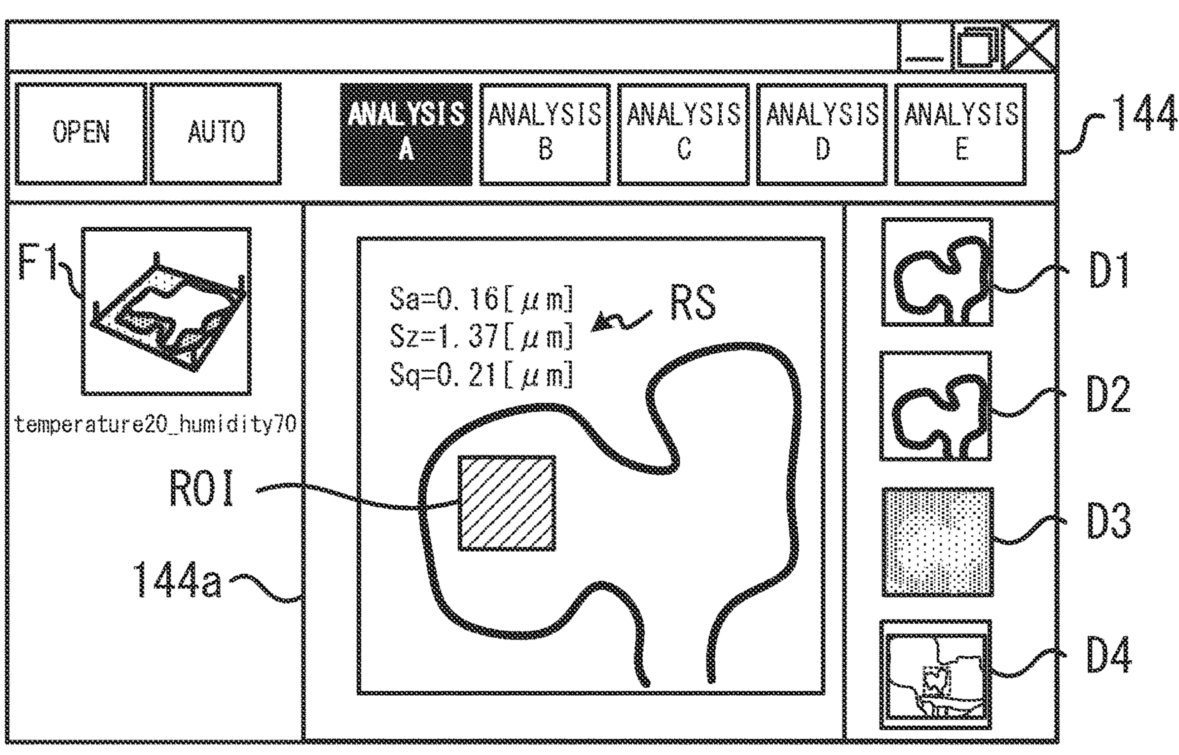
FIG. 17 exemplifies an analysis screen 144 after analysis.

FIG. 15 is a flowchart showing an example of an analysis process. FIG. 16 exemplifies an analysis screen 144 before analysis. FIG. 17 exemplifies an analysis screen 144 after analysis. Hereinafter, referring to FIGS. 15 to 17, the analysis process in step S13 of FIG. 5 is described further in detail.

For example, the analysis process shown in FIG. 15 is started by the experimenter confirming the measurement result displayed on the data obtaining screen 143 and issuing an instruction of analysis. More specifically, the process is started by pressing the button B3 on the data obtaining screen 143 shown in FIG. 14.

When the process shown in FIG. 15 is started, the processors 110 first cause the display device 140 to display the analysis screen 144 shown in FIG. 16 (step S41). On the analysis screen 144, a file F1 of the measurement data to be analyzed is displayed with the file name in a left region on the screen. In a region 144*a* at the center of the image, an image selected using thumbnails of various images (a laser extended image D1, a color extended image D2, a height image D3, and a map image D4) displayed in a right region of the screen is two-dimensionally or three-dimensionally displayed. Note that FIG. 16 shows an example where the laser extended image D1 is three-dimensionally displayed in the region 144*a*.

Subsequently, the experimenter designates an analysis method and a region of interest (ROI), thereby allowing the processors 110 to analyze the measurement data (step S42). More specifically, the processors 110 analyze the region of interest ROI designated on the image displayed in the region 144*a* and generate analysis data, using an analysis method selected by the experimenter from among the analysis methods (analysis A, analysis B, analysis C, and analysis D) displayed on a short cut bar on the analysis screen 144.

The processors 110 that generate the analysis data give the file name of analysis data using the experiment condition when the measurement data is obtained (step S43). Note that the processors 110 may give the file name of the analysis data using the name of the analysis method in addition to the experiment condition, and store the name in the storage devices 120.

Subsequently, the processors 110 cause the display device 140 to display the analysis result, based on the analysis data, on the analysis screen 144 (step S44). More specifically, as shown in FIG. 17, the processors 110 cause the display device 140 to display analysis results RS adjacent to the region of interest ROI in the region 144*a*. Note that FIG. 17 shows a situation where a laser extended image is two-dimensionally displayed in the region 144*a*, the region of interest ROI is analyzed using the analysis method A, and Sa (arithmetic average height), Sz (maximum height) and Sq (square mean root height), which are surface roughness parameters, are measured as the analysis results RS. That is, in this example, the analysis method A is a method of measuring the surface roughness.

FIG. 17 exemplifies the surface roughness measurement as an example of the analysis method. The analysis methods performed by the processors 110 can include various measurements not only the surface roughness measurement but also the width measurement, step (height) measurement, volume measurement, plane angle measurement, and spherical measurement.

Furthermore, the methods may include the profile measurement that measures the luminance and height along any line on an image, the difference analysis that measures the difference of height profile from a reference image, the inter-plane step difference measurement that measures the steps between regions of interest (planes), the planar measurement that measures the number of specific shapes and the area, and the particle analysis that applies a binary process to image data and measures a region extracted from the image.

Figure 18:
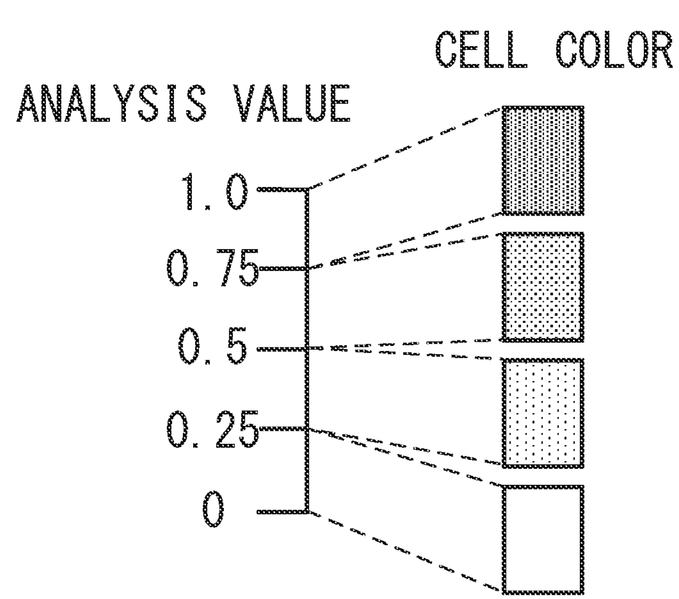
FIG. 18 is a diagram for illustrating a cell color-coding method.

FIG. 18 is a diagram for illustrating the cell color-coding method. Hereinafter, referring to FIG. 18, the color-coding process in step S14 of FIG. 5 is described further in detail.

After the analysis data is generated by analysis, and the analysis result of measurement data is confirmed, the processors 110 color-code, based on the analysis data, the cells in the condition table where the measurement data and analysis data are registered. The color-coding method is not specifically limited. For example, as shown in FIG. 18, by preliminarily assigning colors to the values of analysis data (analysis values), colors according to the analysis values may be assigned to the cells in the condition table.

FIGS. 19 to 24 exemplify the main screen 141 after measurement and analysis. Hereinafter, referring to FIGS. 19 to 24, the display process in step S15 of FIG. 5 is described further in detail.

After measurement and analysis are finished, the processors 110 cause the display device 140 to display the main screen 141 on the foreground, and display a measurement result MS1 in the cell (e.g., the cell corresponding to the experiment condition with the temperature of 20 and the humidity of 70) of the condition table TB selected in the data registration process in step S12, as shown in FIG. 19. The result (measurement results and analysis results) displayed in the cell can be switched by an operation on a button displayed on a short cut bar. FIG. 19 shows a situation where a measurement button is activated, and resultantly the measurement results are displayed in the condition table TB. Note that the result displayed in the cell can be switched not only by the button but also by any UI component, and can be switched by a tab operation, for example.

Figure 20:
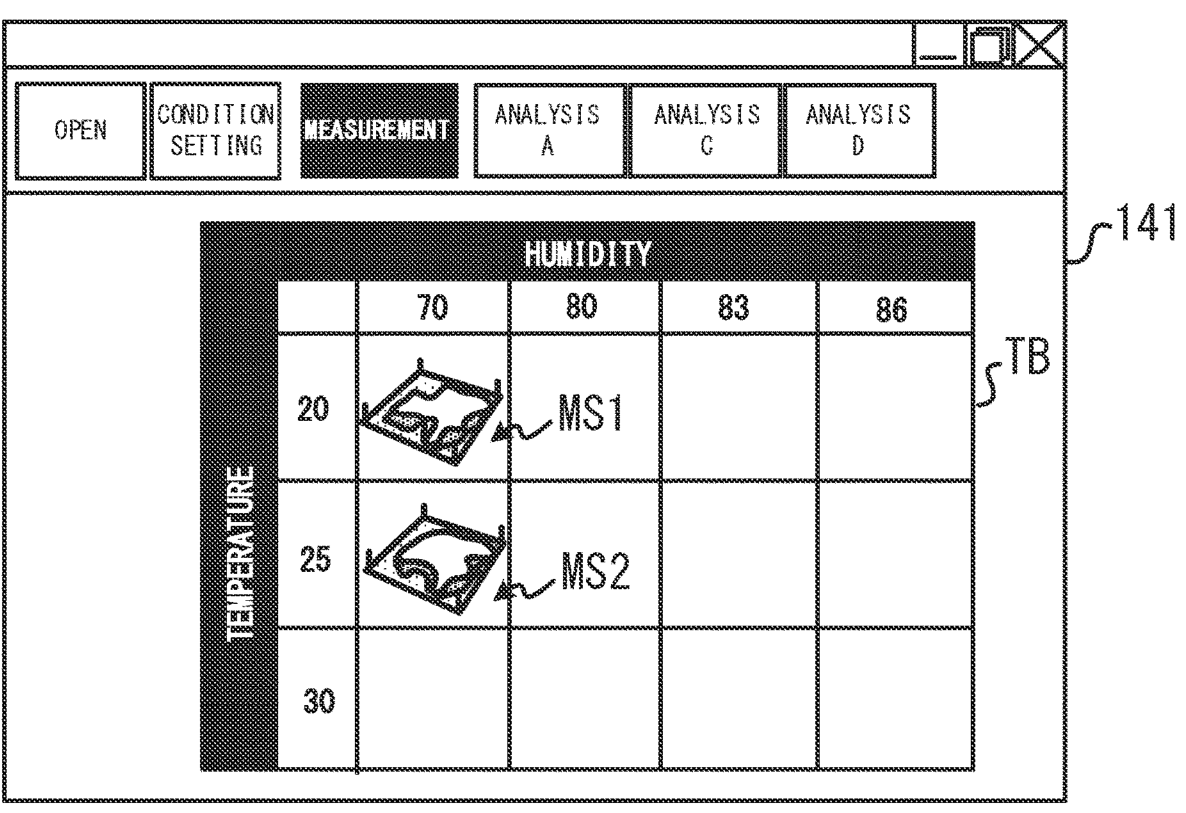
FIG. 20 shows another example of the main screen 141 after measurement and analysis.

Furthermore, after another cell (e.g., the cell corresponding to the experiment condition with the temperature of 25 and humidity of 70) is selected, and measurement and analysis are finished, the processors 110 display a measurement result MS2 in the newly selected cell, as shown in FIG. 20. By repeating selection, measurement and analysis of the cell as described above, the measurement result is added into the cell of the condition table TB one by one. Accordingly, experiment conditions for which measurement has not been performed (e.g., in a case where the condition table TB in FIG. 21 is displayed, the experiment condition with the temperature of 25 and humidity of 80) can be recognized at a glance.

Figure 22:
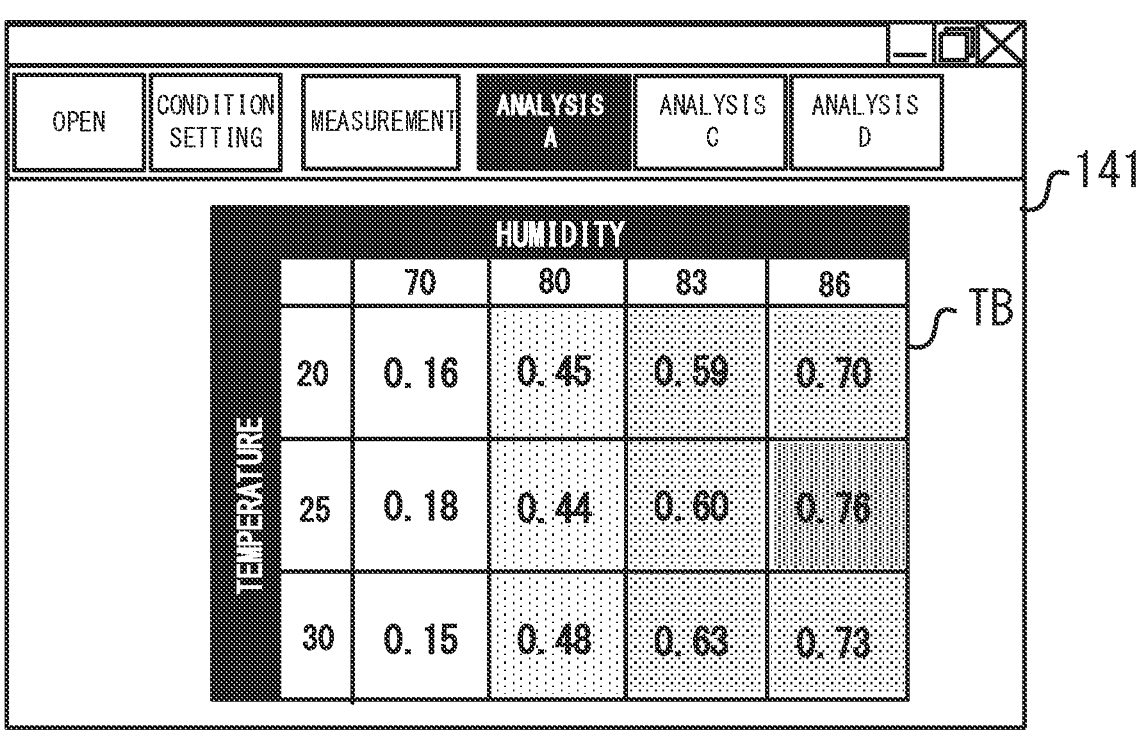
FIG. 22 shows yet another example of the main screen 141 after measurement and analysis.

Only by operating the button on the short cut bar, the condition table TB where the analysis result is displayed in the cell can be displayed as shown in FIGS. 22 and 23. Note that FIG. 22 shows an example where the analysis result using the analysis method A (e.g., the surface roughness measurement) is displayed in the cell. FIG. 23 shows an example where the analysis result using the analysis method D (e.g., the volume measurement) is displayed in the cell.

Listing of the analysis result in the condition table TB allows the correlation between the experiment condition and the experiment result to be grasped only by referring to the condition table TB. For example, by referring to the condition table TB shown in FIG. 22, the tendency of increasing the surface roughness depending on the temperature can be grasped. By referring to the condition table TB shown in FIG. 23, the tendency where the higher the temperature is, and the higher the humidity is, the volume increases can be grasped. By color-coding the cells according to the analysis result, these tendencies can be grasped at a glance. In comparison with discussion using the conventional experiment notebook, the operation efficiency of the experimenter can be significantly improved.

FIGS. 19 to 23 show examples where the two-condition matrix table is displayed as the condition table TB. Alternatively, as shown in FIG. 24, the condition list matrix table may be displayed as the condition table TB on the main screen 141. Note that in a case where the condition list matrix table is displayed on the main screen 141, a two-condition matrix button may be added to the short cut bar. According to display of the condition list matrix table, the experiment results are one-directionally arranged. Accordingly, the correlation between a certain specific experiment condition and an experiment result can be easily grasped. On the other hand, according to display using the two-condition matrix table, the experiment results are two dimensionally arranged. Accordingly, the correlation between two experiment conditions and experiment results can be easily grasped. The experiment results can be more efficiently evaluated in comparison with the case of display of the condition list matrix table.

Figure 25:
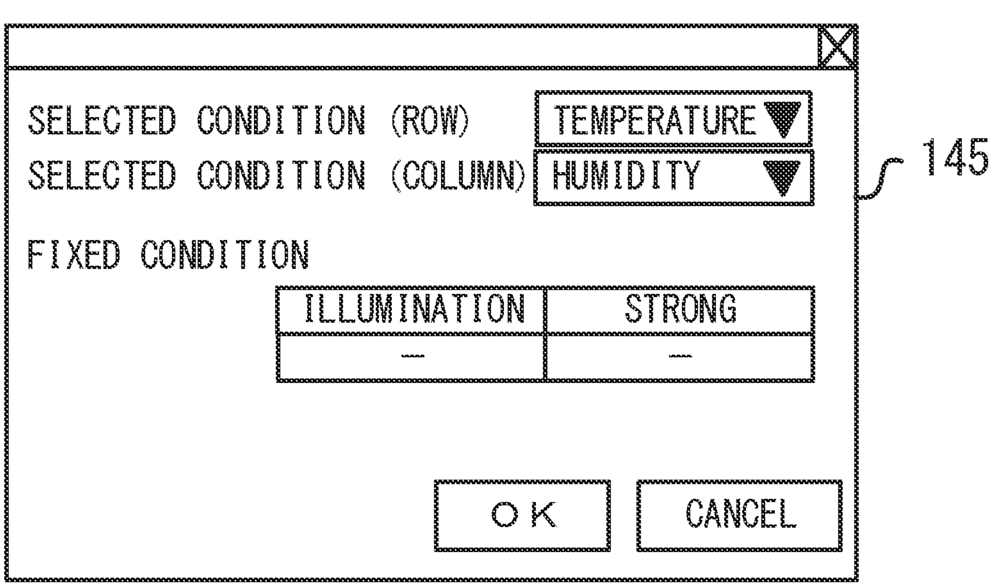
FIG. 25 exemplifies a two-condition matrix setting screen.

When the experimenter presses the two-condition matrix button, the processors 110 cause the display device 140 to display a two-condition matrix setting screen 145 shown in FIG. 25, for example. On the two-condition matrix setting screen 145, the experimenter can select two experiment conditions constituting a two-condition matrix table as selected conditions from among experiment conditions constituting the condition list matrix table, and can further select a condition for fixing the values of the remaining experiment conditions, as a fixed condition. Note that FIG. 25 exemplifies setting where the temperature and the humidity are selected as selected conditions, and the value of illumination that is the remaining experiment condition is fixed to "STRONG".

By executing setting shown in FIG. 25, the processors 110 can create the two-condition matrix table shown in FIG. 23 from the condition list matrix table shown in FIG. 24, and change the condition table TB displayed by the display device 140 to the two-condition matrix table. By displaying the two-condition matrix table, the correlation between the experiment condition and the experiment result can be more easily grasped in comparison with the case of displaying the condition list matrix table. Once the condition list matrix table is created, the two-condition matrix table can be created using any experiment condition included in the condition list matrix table by an easy operation. Accordingly, by displaying the two-condition matrix table corresponding to a combination of various experiment conditions through switching the experiment conditions, a certain experiment condition having a correlation with the experiment result can be found.

The embodiments described above is a specific example in order to facilitate understanding of the invention. The present invention is not limited to these embodiments. Modified embodiments obtained by modifying the embodiments described above, and alternative embodiments that substitute the embodiments described above can be encompassed. That is, each embodiment may allow the configuration elements to be modified in a range without departing from the spirit and scope. By appropriately combining multiple configuration elements disclosed in one or more embodiments, new embodiments can be implemented. Some configuration elements may be removed from the configuration elements indicated in each embodiment, or some configuration elements may be added to the configuration elements indicated in the embodiments. The order of the processing procedures shown in each embodiment may be replaced as long as there is no contradiction. That is, the experiment support apparatus, the experiment support system, the experiment support method, and the computer-readable medium of the present invention may be variously modified and changed in a range without departing from the description of the claims.

For example, according to the embodiments described above, the example is described where the experiment support apparatus 100 executes the experiment support method using the measurement data obtained by measurement through the measurement apparatus 200, which is an industrial microscope apparatus. The experiment support apparatus 100 may use measurement data obtained by measurement through another microscope apparatus. The measurement apparatus may be, for example, a biological microscope apparatus, an SPM (scanning probe microscope) typified by an STM (scanning tunneling microscope) and an AFM (atomic force microscope), a white-light interferometer, etc. The measurement apparatus may be any imaging apparatus, and for example, may use measurement data obtained by measurement through the measurement apparatus 300 that is an imaging apparatus that images a specimen contained in a culture vessel.

Figure 26:
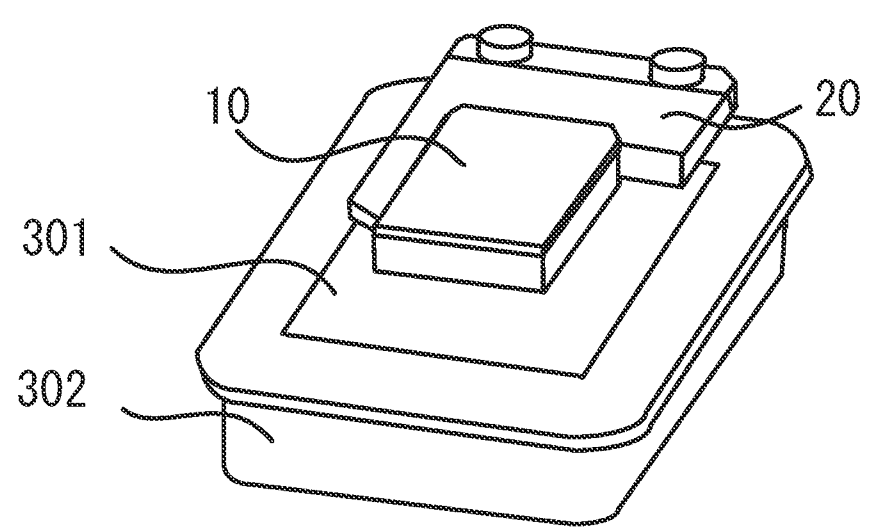
FIG. 26 is a perspective view of a measurement apparatus 300.
Figure 27:
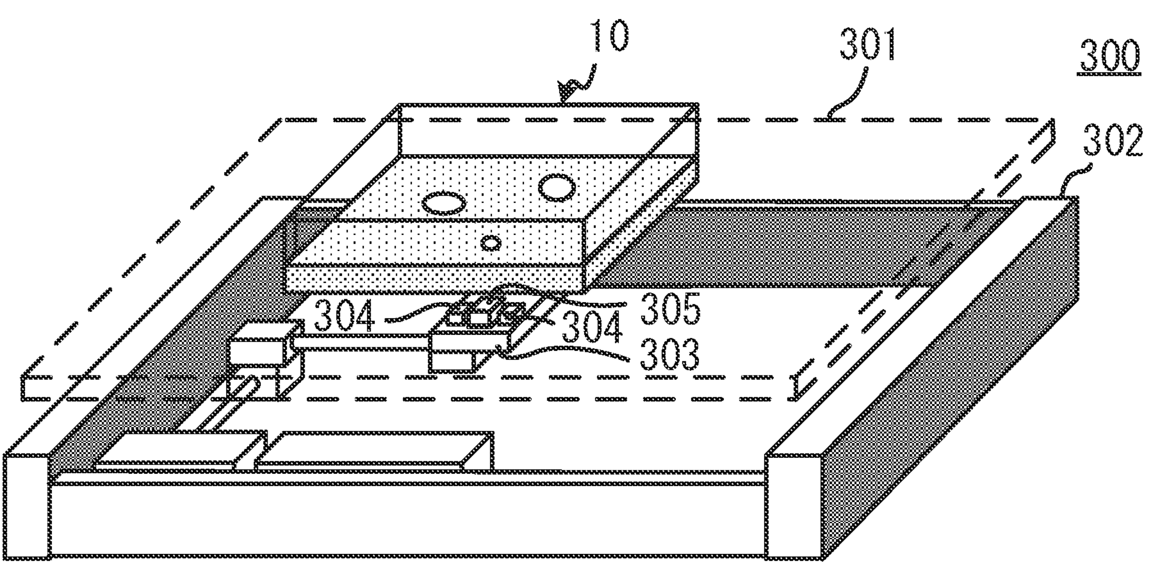
FIG. 27 exemplifies a configuration of the measurement apparatus 300.
Figure 28:
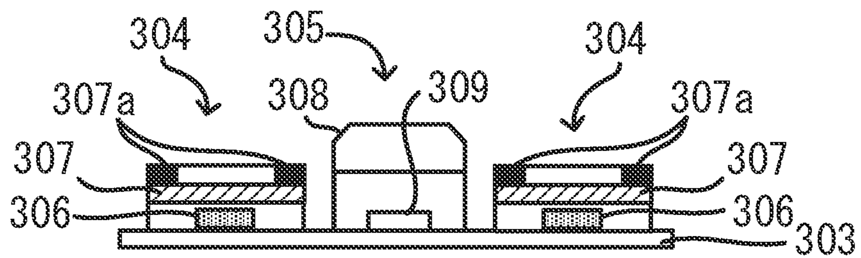
FIG. 28 exemplifies configurations of light source units 304 and an imaging unit 305.

FIG. 26 is a perspective view of the measurement apparatus 300. FIG. 27 exemplifies the configuration of the measurement apparatus 300. FIG. 28 exemplifies configurations of light source units 304 and an imaging unit 305. The measurement apparatus 300 shown in FIG. 26 may be used for imaging the specimen without taking the specimen out of an incubator, for example, used in a state of being arranged in the incubator. Hereinafter, referring to FIGS. 26 to 28, the configuration of the measurement apparatus 300 is specifically described.

As shown in FIGS. 26 and 27, the measurement apparatus 300 is arranged in the incubator in a state where a culture vessel 10 is mounted on a transparent window 301 of the measurement apparatus 300, and for example, images the specimen in the culture vessel 10 according to an instruction from the experiment support apparatus 100 and generates image data. Note that the transparent window 301 is a transparent top board constituting an upper surface of a housing 302 of the measurement apparatus 300, and constitutes a mounting surface on which the culture vessel is mounted. The transparent window 301 is made of glass or transparent resin, for example.

As shown in FIG. 26, the measurement apparatus 300 includes: a box-shaped housing 302 that includes the transparent window 301, as an upper surface, which is transparent and on which the culture vessel 10 is arranged; and a positioning member 20 that positions the culture vessel 10 to a predetermined position on the transparent window 301 (mounting surface). Note that the positioning member 20 is fixed to the housing 302. The positioning member 20 can be detached as required, and may be replaced with another positioning member having a different shape depending on a vessel to be used.

As shown in FIGS. 27 and 28, the measurement apparatus 300 further includes: a stage 303 that moves in the housing 302; a pair of light source units 304 that illuminate a specimen; and an imaging unit 305 that images the specimen. The stage 303, the light source unit 304, and the imaging unit 305 are internally contained in the housing 302. The light source unit 304 and the imaging unit 305 are arranged on the stage 303. The stage 303 moves in the housing 302, thereby moving the units with respect to the culture vessel 10. The stage 303 is movable in the X direction and the Y direction that are parallel to the transparent window 301 (mounting surface) and are orthogonal to each other. Note that the stage 303 may further move also in the Z direction orthogonal to both the X direction and the Y direction.

Note that FIGS. 27 and 28 show the example where the light source units 304 and the imaging unit 305 are arranged on the stage 303, and resultantly move in the housing 302 in an integral manner. The light source units 304 and the imaging unit 305 may independently move in the housing 302. FIGS. 27 and 28 show the example where the pair of light source units 304 are arranged left and right allowing the imaging unit 305 to intervene therebetween. The arrangement and the number of light source units 304 are not limited to this example. For example, three or more light source units 304 may be provided on the stage 303. Alternatively, only one unit may be provided.

As shown in FIG. 28, each light source unit 304 includes a light source 306, and a diffuser panel 307. The light source 306 may include, for example, a light emitting diode (LED). The light source 306 may include a white LED, or include multiple LEDs emitting light beams having different wavelengths, such as of R (red), G (green) and B (blue). The light emitted from the light source 306 enters the diffuser panel 307.

The diffuser panel 307 diffuses the light emitted from the light source 306. Although not specifically limited, the diffuser panel 307 is, for example, a frost-type diffuser panel on which irregularities are formed on the surface. Note that the diffuser panel 307 may be a surface-coated opal-type diffuser panel, or a diffuser panel of another type. Furthermore, masks 307*a* for limiting a diffusion light emission region may be formed on the diffuser panel 307. The light emitted from the diffuser panel 307 travels in various directions.

As shown in FIG. 28, the imaging unit 305 includes an optical system 308, and an image pick-up element 309. The optical system 308 condenses light having passed through the transparent window 301 and then entered the housing 302. Although not specifically limited, the optical system 308 is a finite correction objective lens that forms an image at a finite position, for example. Note that the optical system 308 may include an infinite correction objective lens. It is only required that a finite correction optical system is configured by the entire optical system 308. The optical system 308, which focuses on the bottom surface of the culture vessel 10 in which the specimen resides, condenses the light having entered the housing 302, on the image pick-up element 309, thereby forming an optical image of the specimen on the image pick-up element 309.

The image pick-up element 309 is an optical sensor that converts the detected light into an electric signal. Specifically, the image pick-up element 309 is an image sensor. Although not specifically limited, this element is, for example, a CCD (charge-coupled device) image sensor, a CMOS (complementary MOS) image sensor or the like.

The measurement apparatus 300 configured as described above adopts oblique illumination in order to visualize the specimen, which is a phase object, in the culture vessel 10. Specifically, the light emitted by the light source 306 is diffused by the diffuser panel 307, and is emitted to the outside of the housing 302 without through the optical system 308. That is, the light source units 304 emit light, which is to travel in various directions, to the outside of the housing 302 without through the optical system 308. Subsequently, a part of light emitted to the outside of the housing 302 is, for example, reflected by the upper surface of the culture vessel 10, and is deflected above the specimen. Part of the light deflected above the specimen is emitted to the specimen, and passes through the specimen and the transparent window 301, and enters the housing 302 accordingly. Part of the light having entered the housing 302 is condensed by the optical system 308, and an image of the specimen is formed on the image pick-up element 309. That is, in order to form, on the image pick-up element 309, an image of the specimen in the culture vessel 10 mounted on the transparent window 301, the optical system 308 condenses light having passed through the transparent window 301 and entered the housing 302. Lastly, the measurement apparatus 300 generates image data on the specimen, based on an electric signal output from the image pick-up element 309, and outputs the image data as measurement data to the experiment support apparatus 100.

The experiment support apparatus 100 may execute the experiment support method described above, based on the measurement data obtained from the measurement apparatus 300. Note that in a case where an experiment is performed using the measurement apparatus 300, examples are shown where the experiment conditions are, for example, the frequency of medium replacement, the type of the medium, the passage number of cell culture, the culture time period, the temperature, the $CO_2$ concentration, $O_2$ concentration and the like, although there is no limitation thereto. Although not specifically limited, as the analysis methods, for example, methods are exemplified that include methods of measuring the number of cells, the cell density, the number of colonies, the growth rate, the number of divisions, the colony area, and the colony height.

The embodiments described above show the examples where the specimen is manually arranged in the measurement apparatus in conformity with the selected cell in the condition table, and is measured. Alternatively, the specimen may be arranged automatically in response to selection of the cell. For example, specimens may be preliminarily kept in conformity with various experiment conditions, and a specimen in conformity with the cell selected by the experimenter may be conveyed to the measurement apparatus by the conveyer device. In this case, the conveyer device may identify the specimen in conformity with the experiment condition, based on identification information assigned to the vessel that contains the specimen, for example. The identification information may be, for example, a one-dimensional code, such as a bar code, or a two-dimensional code, such as a QR code (R).

The conveyer device may sequentially arrange the specimens in conformity with various experiment conditions in the measurement apparatus. The measurement apparatus may sequentially measure the specimens conveyed by the conveyer device, and generate measurement data. The measurement apparatus may identify the experiment condition in conformity with the specimen with respect to an identification code assigned to the vessel for the specimen during measurement, or output the identified experiment condition, with measurement data, to the experiment support apparatus. In this case, after the condition table is created based on the experiment condition output from the measurement apparatus, the experiment support apparatus may register the measurement data and the analysis data in the cell of the condition table automatically without selection of the cell by the experimenter.

In this specification, representation of "based on A" does not mean "based only on A", but means "based on at least A", and further means "based partially on at least A". That is, "based on A" may be based on B in addition to A, and may be based on part of A.

In this specification, terms modifying nouns, such as "first" and "second", do not limit the amount or order of elements represented by the nouns. The terms are used to discriminate two or more elements from each other, and are nothing less or nothing more. Consequently, identification of "first" and "second" elements does not mean that the "first" element precedes the "second" element, and does not negate presence of a "third" element.

What is claimed is:

1. An optical microscope configured to measure a specimen, the optical microscope having an experiment support function, and the optical microscope comprising:

at least one non-transitory computer-readable medium storing instructions thereon; and at least one processor configured to, under control of the instructions, execute operations comprising:

controlling a display device to display a condition table that indicates two experiment conditions for measurement, in response to input of the two experiment conditions, the two experiment conditions including a first experiment condition and a second experiment condition of a type different from a type of the first experiment condition, one of the two experiment conditions being arranged vertically in the condition table, and the other of the two experiment conditions being arranged horizontally in the condition table;

receiving, from a user, input of (i) a selection instruction selecting a specific cell of the condition table, and (ii) a start instruction instructing a start of measurement of the specimen under the two experiment conditions corresponding to the selected cell;

controlling to perform the measurement of the specimen, in response to receiving the start instruction;

obtaining measurement data generated by performing the measurement of the specimen under the two experiment conditions corresponding to the selected cell; and controlling the display device to display at least one of (i) a measurement result of the measurement of the specimen based on the measurement data, and (ii) an analysis result of the measurement data, to the selected cell of the condition table, in response to obtaining the measurement data.

2. The optical microscope according to claim 1, wherein the controlling the display to display the at least one of the measurement result and the analysis result includes controlling the display device to update the display of the condition table every time the measurement data obtained using the optical microscope is input.

3. The optical microscope according to claim 1, wherein the controlling the display device to display the condition table includes creating the condition table in a format depending on a number of experiment conditions designated for corresponding measurement data.

4. The optical microscope according to claim 3, wherein when the number of experiment conditions is greater than two, the controlling the display device to display the condition table includes arranging values of the experiment conditions designated for the corresponding measurement data so as not to intersect each other.

5. The optical microscope according to claim 4, wherein the controlling the display device to display the condition table includes arranging the values of at least one of the experiment conditions, in the condition table, in an order of numerical values or degrees of the values of the at least one of the experiment conditions.

6. The optical microscope according to claim 1, wherein the controlling the display device to display the condition table includes:

arranging values of the first experiment condition, in the condition table, in an order of numerical values or degrees of the values of the first experiment condition; and arranging values of the second experiment condition, in the condition table, in an order of numerical values or degrees of the values of the second experiment condition.

7. The optical microscope according to claim 1, wherein:

the operations further include analyzing, using at least one designated analysis method, the measurement data obtained using the optical microscope under the two experiment conditions, and generating analysis data indicating the analysis result of the measurement data, and the controlling the display device to display the at least one of the measurement result and the analysis result includes controlling the display device to display the analysis result in the selected cell.

8. The optical microscope according to claim 7, wherein the operations further include color-coding, based on the analysis data, at least one cell in the condition table in which the analysis result is displayed.

9. The optical microscope according to claim 1, wherein the operations further comprise including, within a file name of the measurement data obtained using the optical microscope under the two experiment conditions corresponding to the selected cell of the condition table, information indicating the two experiment conditions under which the measurement data was obtained.

10. An optical microscope configured to measure a specimen, the optical microscope having an experiment support function, and the optical microscope comprising:

at least one non-transitory computer-readable medium storing instructions thereon; and at least one processor configured to, under control of the instructions, execute operations comprising:

controlling a display device to display a condition table that indicates an experiment condition for measurement, in response to an input of the experiment condition;

receiving, from a user, input of (i) a selection instruction selecting a specific cell of the condition table, and (ii) a start instruction instructing a start of measurement of the specimen under the experiment condition corresponding to the selected cell;

controlling to perform the measurement of the specimen, in response to receiving the start instruction;

obtaining measurement data generated by performing the measurement of the specimen under the experiment condition corresponding to the selected cell; and controlling the display device to display at least one of (i) a measurement result of the measurement of the specimen based on the measurement data, and (ii) an analysis result of the measurement data, in the selected cell of the condition table, in response to obtaining the measurement data.

11. The optical microscope according to claim 10, wherein the operations further include:

analyzing, using at least one designated analysis method, the measurement data obtained using the optical microscope under the experiment condition, and generating analysis data indicating the analysis result of the measurement data; and color-coding at least one cell in the condition table by assigning one of at least three different colors to each of the at least one cell according to respective values of the analysis data on which the analysis result corresponding thereto is based.

12. An experiment support method performed under control by an optical microscope configured to measure a specimen, the optical microscope having an experiment support function, and the method comprising:

controlling a display device to display a condition table that indicates an experiment condition for measurement, in response to input of the experiment condition;

receiving, from a user, input of (i) a selection instruction selecting a specific cell of the condition table, and (ii) a start instruction instructing a start of measurement of the specimen under the experiment condition corresponding to the selected cell;

controlling to perform the measurement of the specimen, in response to receiving the start instruction;

obtaining measurement data generated by performing the measurement of the specimen under the experiment condition corresponding to the selected cell;

controlling the display device to display at least one of (i) a measurement result of the measurement of the specimen based on the measurement data, and (ii) an analysis result of the measurement data, in the selected cell of the condition table, in response to obtaining the measurement data;

analyzing, using at least one designated analysis method, the measurement data obtained using the optical microscope under the experiment conditions, and generating analysis data indicating the analysis result of the measurement data; and color-coding at least one cell in the condition table by assigning one of at least three different colors to each of the at least one cell according to respective values of the analysis data on which the analysis result corresponding thereto is based.

13. A non-transitory computer-readable medium storing a program thereon for controlling an experiment support function of an optical microscope configured to measure a specimen, the program being executable by a computer of the optical microscope to control the optical microscope to execute processes comprising:

controlling a display device to display a condition table that indicates an experiment condition for measurement, in response to input of the experiment condition;

receiving, from a user, input of (i) a selection instruction selecting a specific cell of the condition table, and (ii) a start instruction instructing a start of measurement of the specimen under the experiment condition corresponding to the selected cell;

controlling to perform the measurement of the specimen, in response to receiving the start instruction;

obtaining measurement data generated by performing the measurement of the specimen under the experiment condition corresponding to the selected cell;

controlling the display device to display at least one of (i) a measurement result of the measurement of the specimen based on the measurement data, and (ii) an analysis result of the measurement data, in the selected cell of the condition table, in response to obtaining the measurement data;

analyzing, using at least one designated analysis method, the measurement data obtained using the optical microscope under the experiment conditions, and generating analysis data indicating the analysis result of the measurement data; and color-coding at least one cell in the condition table by assigning one of at least three different colors to each of the at least one cell according to respective values of the analysis data on which the analysis result corresponding thereto is based.

* * * * *